(12) United States Patent
Camenisch et al.

(10) Patent No.: US 10,079,686 B2
(45) Date of Patent: Sep. 18, 2018

(54) PRIVACY-PRESERVING ATTRIBUTE-BASED CREDENTIALS

(71) Applicant: International Business Machines Corporation, Armonk, NY (US)

(72) Inventors: Jan L. Camenisch, Thalwil (CH); Robert R. Enderlein, Adliswil (CH); Anja Lehmann, Zürich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/811,882

(22) Filed: Jul. 29, 2015

(65) Prior Publication Data

US 2017/0033934 A1    Feb. 2, 2017

(51) Int. Cl.
*H04L 29/06* (2006.01)
*H04L 9/32* (2006.01)

(52) U.S. Cl.
CPC .......... *H04L 9/3263* (2013.01); *H04L 9/3268* (2013.01)

(58) Field of Classification Search
CPC ....... H04L 9/32; H04L 9/3263; H04L 9/3268; H04L 9/3247; H04L 2209/42; H04L 63/0823; H04L 9/3221; H04W 12/02
USPC ........................................................ 713/158
See application file for complete search history.

(56) References Cited

U.S. PATENT DOCUMENTS

| | | | |
|---|---|---|---|
| 5,892,899 A | 4/1999 | Aucsmith et al. | |
| 7,526,651 B2 | 4/2009 | Arditti Modiano et al. | |
| 8,171,306 B2 * | 5/2012 | Venkatesan | G06F 21/14 713/172 |
| 8,220,058 B2 * | 7/2012 | de Jong | G06F 21/14 726/26 |
| 8,332,649 B2 | 12/2012 | Yokota et al. | |

(Continued)

FOREIGN PATENT DOCUMENTS

| | | |
|---|---|---|
| PT | 105979 A | 4/2013 |
| WO | 9913613 A1 | 3/1999 |

OTHER PUBLICATIONS

Acar et al., "Accumulators and U-Prove Revocation", FC 2013, LNCS 7859, pp. 189-196, 2013.

(Continued)

*Primary Examiner* — Yogesh Paliwal
(74) *Attorney, Agent, or Firm* — Kristofer L. Haggerty

(57) ABSTRACT

The invention relates to an obfuscated program logic of machine executable instructions and a hardcoded cryptographic signing key. The obfuscated program logic further comprising a hardcoded first attribute value wherein execution of the machine executable instructions by the processor causes the obfuscated program logic to receive a request and in response to receiving the request evaluate whether the request is related to the hardcoded first attribute value. In case the request is related to the hardcoded first attribute value, then computing with the hardcoded first attribute value a response to the request and computing with the cryptographic signing key a signature, wherein the signature certifies the request for which the response was computed and certifies the authenticity of the response. Then generating and returning a presentation token comprising the response and the signature, and providing the presentation token to a receiver computer system.

24 Claims, 11 Drawing Sheets

(56) References Cited

U.S. PATENT DOCUMENTS

| | | | |
|---|---|---|---|
| 2010/0241872 A1 | 9/2010 | Pinder | |
| 2012/0324231 A1* | 12/2012 | Camenisch | H04L 9/302 713/176 |
| 2014/0281525 A1* | 9/2014 | Acar | H04L 9/3213 713/168 |
| 2014/0359289 A1* | 12/2014 | Camenisch | H04L 9/0866 713/168 |
| 2015/0039902 A1 | 2/2015 | Arya et al. | |

OTHER PUBLICATIONS

Au et al., "Constant-Size Dynamic k-TAA", SCN 2006, vol. 4116 of LNCS, Sep. 2006, pp. 111-125.
Brickell et al., "Direct Anonymous Attestation", ACM CCS '04, Oct. 25-29, 2004, pp. 132-145.
Bichsel et al., "D2.2—Architecture for Attribute-based Credential Technologies—Final Version", Version 1.0, Aug. 14, 2014, ABC4Trust, Deliverable D2.2, pp. 1-148.
Backes et al., "Operational Signature Schemes", Cryptology ePrint Archive, Report 2014/820, 2014, pp. 1-37.
Barak et al., "On the (Im)possibility of Obfuscating Programs", CRYPTO 2001, vol. 2139 of LNCS, Aug. 2001, pp. 1-18.
Boneh et al., "Short Signatures from the Weil Pairing", ASIACRYPT 2001, vol. 2248 of LNCS, pp. 514-532, Dec. 2001.
Boudot, Efficient Proofs that a Committed Number Lies in an Interval, EUROCRYPT 2000, vol. 1807 of LNCS, pp. 431-444, May 2000.
Bellare et al., "Random Oracles are Practical: A Paradigm for Designing Efficient Protocols", First Conference on Computer and Communications Security, ACM, Nov. 1993, pp. 62-73.
Brands, "Rethinking Public Key Infrastructures and Digital Certificates", Building in Privacy, MIT Press, Aug. 2000, p. 1.
Camenisch et al., "Efficient Protocols for Set Membership and Range Proofs", ASIACRYPT 2008, vol. 5350 of LNCS, pp. 234-252, Dec. 2008.
Camenisch et al., "Verifiable Encryption, Group Encryption, and Their Applications to Separable Group Signatures and Signature Sharing Schemes", ASIACRYPT 2000, vol. 1976 of LNCS, pp. 331-345, Dec. 2000.
Cramer et al., "Proofs of Partial Knowledge and Simplified Design of Witness Hiding Protocols", Advances in Cryptology, CRYPTO '94, vol. 839 of LNCS, pp. 174-187, Aug. 1994.
Camenisch et al., "Efficient Attributes for Anonymous Credentials", ACM CCS '08, Oct. 27-31, 2008, pp. 345-356.
Chaum et al., "Security Without Identification: Transaction Systems to Make Big Brother Obsolete", Communications of the ACM, vol. 28, No. 10, pp. 1030-1044, Oct. 1985.
Camenisch et al., "Formal Treatment of Privacy-Enhancing Credential Systems", for Project ABC4Trust, this document is an updated version of [CKM+14], IACR Cryptology ePrint Archive, 2014, pp. 1-71.
Camenisch et al., "On the Portability of Generalized Schnorr Proofs", EUROCRYPT 2009, vol. 5479 of LNCS, pp. 425-442, Apr. 2009.
Camenisch et al., "Dynamic Accumulators and Application to Efficient Revocation of Anonymous Credentials", CRYPTO 2002, vol. 2442 of LNCS, pp. 61-76, Aug. 2002.
Camenisch et al., "A Signature Scheme with Efficient Protocols", SCN 2002, vol. 2576 of LNCS, pp. 268-289, Sep. 2002.
Camenisch et al., "Signature Schemes and Anonymous Credentials from Bilinear Maps", CRYPTO 2004, vol. 3152 of LNCS, pp. 56-72, Aug. 2004.
Chaabouni et al., "A Non-interactive Range Proof with Constant Communication", FC 2012, vol. 7397 of LNCS, pp. 179-199, Feb. / Mar. 2012.
Camenisch et al., "Practical Verifiable Encryption and Decryption of Discrete Logarithms" CRYPTO 2003, vol. 2729 of LNCS, pp. 126-144, Aug. 2003.
Collberg et al., "Watermarking, Tamper-Proofing, and Obfuscation-Tools for Software Protection", IEEE Transactions on Software Engineering, vol. 28, No. 8, Aug. 2002, pp. 735-746.
Feige et al., Abstract for "Multiple NonInteractive Zero Knowledge Proofs Under General Assumptions", SIAM Journal on Computing, vol. 29, Issue 1, Feb. 2000, pp. 1-28.
Garg et al., "Candidate Indistinguishability Obfuscation and Functional Encryption for all circuits (Extended Abstract)", 2013 IEEE 54th Annual Symposium on Foundations of Computer Science, 2013 IEEE, pp. 40-49.
Goldreich et al., "How to Prove All NP Statements in Zero-Knowledge and a Methodology of Cryptographic Protocol Design" CRYPTO '86, vol. 263 of LNCS, pp. 171-185, 1987.
Lapon, "Anonymous Credential Systems: From Theory Towards Practice", PhD Thesis, Katholieke Universiteit Leuven, Dissertation presented in partial fulfillment of the requirements for the degree of Doctor in Engineering, Jul. 2012, pp. 1-243.
Lysyanskaya, "Unique Signatures and Verifiable Random Functions from the DH-DDH Separation", CRYPTO 2002, vol. 2442 of LNCS, pp. 597-612, Aug. 2002.
Nguyen, "Accumulators from Bilinear Pairings and Applications", CT-RSA 2005, vol. 3376 of LNCS, pp. 275-292, Feb. 2005.
Rivest et al., "A Method for Obtaining Digital Signatures and Public-Key Cryptosystems", Communications of the Association for Computing Machinery, vol. 21, No. 2, pp. 120-126, Feb. 1978.
Pearson et al., "A Privacy Manager for Cloud Computing", CloudCom 2009, LNCS 5931, pp. 90-106, 2009.
Apple, "iTunes. Your movies, TV shows, and music take center stage.", http://itunes.apple.com/itunes/, pp. 1-4, printed on Oct. 15, 2015.
Netflix, "Overview", http://ir.netflix.com/ pp. 1-2, printed on Oct. 15, 2015.

\* cited by examiner

PRIVACY-PRESERVING ATTRIBUTE-BASED CREDENTIALS

TECHNICAL FIELD

The present invention relates to access credentials and, more specifically, to methods for generating and applying a privacy-preserving attribute based credential. The invention further relates to a computer program product and a computer system configured to execute a method for generating and applying a credential.

BACKGROUND

Credentials, and more precisely cryptographic credentials, are commonly known and used to certify access to cryptography-based applications, e.g. cryptographically secured exchange of data between computer systems and/or devices. A credential holder who is requested to provide information may provide the requested information and use a credential to prove that information provided by him is correct and trustable. A cryptographic credential is essentially a certificate generated via a cryptographic process. Such a credential is issued by a credential issuing entity to a credential holder. In general, the credential issuing entity appropriately verifies the information to be certified before issuing the credential. Thereby, the credential issuing entity establishes a trust anchor, i.e. it is an authoritative entity for which trust is assumed and not derived. For example, in X.509 architecture, a root certificate issued by a root certificate issuing entity may be the trust anchor from which a chain of trust is derived. The information in question is cryptographically encoded in the credential to certify the correctness of said information. In particular, the information to be certified may be represented by some value or function which is then encoded in the credential via a cryptographic algorithm. When requested by a verifying entity to provide certain information and to prove the same, the credential holder may provide the requested information and use his credential, in which the respective information is encoded, to make a suitable proof to the verifying entity via various cryptographic proof protocols.

Privacy-preserving Attribute-Based Credentials or Privacy-ABCs, sometimes also known as anonymous credentials or minimal disclosure tokens, allows a user computer system to authenticate to a verifying computer system in a privacy-preserving manner. An issuing computer system assigns attributes to a user computer system by issuing a credential containing the list of attributes for that user computer system. The user computer systems, receiving the credential, can then use this credential to convince a verifying computer system that his certified attributes satisfy certain properties without disclosing more information than strictly necessary.

SUMMARY

It is an objective of the present invention to provide for an improved computer-implemented method, a computer program product, and a computer system for generating and/or handling credentials as specified in the independent claims. Embodiments of the invention are given in the dependent claims. Embodiments of the present invention can be freely combined with each other if they are not mutually exclusive.

In one aspect, the invention relates to a computer-implemented method of operating a computer system comprising a memory for storing machine executable instructions and a processor for executing the machine executable instructions. The invention further relates to an executable program logic being stored in the memory comprising an obfuscated program logic of machine executable instructions and a hardcoded cryptographic signing key. The obfuscated program logic further comprising a hardcoded first attribute value wherein execution of the machine executable instructions by the processor causes the obfuscated program logic to receive a request and in response to receiving the request evaluate whether the request is related to the hardcoded first attribute value. In case the request is related to the hardcoded first attribute value, then computing with the hardcoded first attribute value a response to the request and computing with the cryptographic signing key a signature, wherein the signature certifies the request for which the response was computed and certifies the authenticity of the response. Then generating and returning a presentation token comprising the response and the signature, and providing the presentation token to a receiver computer system.

In a further aspect, the invention relates to a computer-implemented method of generating a credential using a computer system comprised of a memory for storing machine executable instructions and a processor for executing the machine executable instructions. The execution of the machine executable instructions by the processor causes the system to provide a cryptographic signing key, generate an executable program logic, and hardcode the cryptographic signing key and a first attribute value into the executable program logic. The executable program logic is configured for receiving a request and in response to receiving the request, evaluating whether the request is related to the hardcoded first attribute value. In case the request is related to the hardcoded first attribute value, then computing with the hardcoded first attribute value a response to the request and computing with the cryptographic signing key a signature, wherein the signature certifies the request for which the response was computed and certifies the authenticity of the response. Then generating and returning a presentation token comprising the response and the signature, obfuscating the generated executable program logic, and providing the obfuscated executable program logic to a receiver computer system.

In a further aspect, the invention relates to a computer program product comprising a computer readable storage medium having machine executable instructions embodied therewith, wherein the executable instructions being executable by a processor to cause the processor to execute the aforementioned computer-implemented methods.

In a further aspect, the invention relates to a computer system comprising a memory for storing machine executable instructions and a processor for executing the machine executable instructions, wherein execution of the machine executable instructions by the processor causes the system to execute the aforementioned computer-implemented methods.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
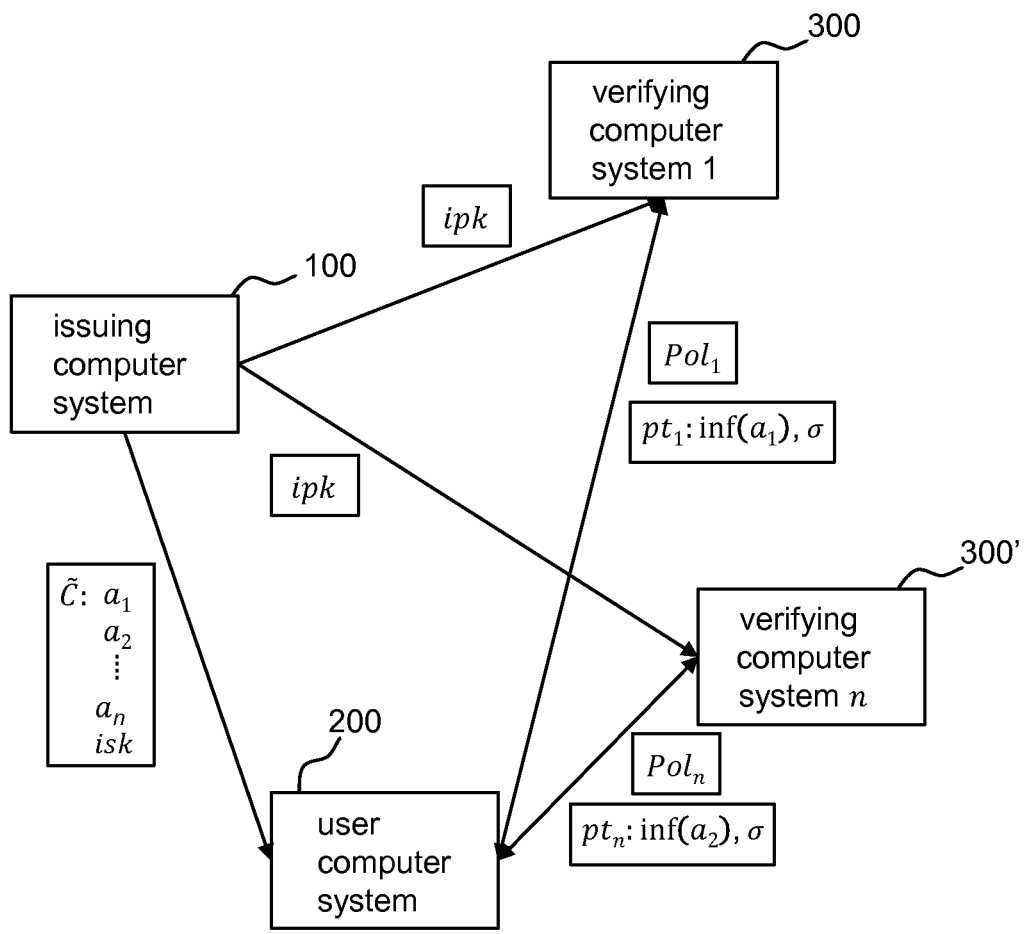
FIG. 1 depicts a schematic block diagram illustrating an exemplary computer system.

Embodiments may be beneficial in that they allow to construct an anonymous credential system in which a privacy-preserving attribute based credential may be effectively generated and handled by applying code obfuscation. The privacy-preserving attribute based credential may be provided in form of an obfuscated program logic which may be used to convince a receiving and verifying computer system that the attribute values provided by the obfuscated program logic and verified by the cryptographic signing key satisfy certain properties without disclosing more information than strictly necessary and without being traceable between different presentations, i.e. the privacy remains preserved. The verifying computer system may specify by a request which attribute values are required to be disclosed or which predicates, e.g. equality or inequality, are expected to be fulfilled by the attribute values. The request may comprise a presentation policy identifying the required information. By executing the obfuscated program logic, a presentation token is generated that may provide cryptographic evidence of the disclosed attribute values and that the predicates are satisfied. By generating a signature, the request for which a response was computed may be identified and the authenticity of the response verified. The signature computed with the cryptographic signing key may be verifiable with a cryptographic signature verification key, e.g. public cryptographic key: A receiver computer system receiving the presentation token is thus enabled to verify the signature comprised by the presentation token with a public cryptographic key.

An obfuscated program logic according to these embodiments may be beneficially applied in government or electronic ID cards certifying personal or other security-sensitive information, like a user's name, nationality, municipality, date of birth hardcoded in the obfuscated program logic. Proofs about these attribute values may need to be made e.g. in order to gain access to a software and/or hardware function provided by a verifying computer system. Such functions comprise e.g. access to a service, facility or other resource. The user computer system may use the obfuscated program logic to authenticate to a verifying computer system by generating a presentation token.

Moreover, different presentation tokens generated using obfuscated program logic may have the advantage to be untraceable, in the sense that a verifier cannot tell whether they were computed by the same or by different user computer systems.

A high level of security may be guaranteed by the obfuscation of the program logic comprising the hardcoded cryptographic signing key and a hardcoded first attribute value. Due to obfuscation, hardcoded values cannot be derived from the plain text of the obfuscated program logic, which is unintelligible. Furthermore, the signature computed with the cryptographic signing key due to its uniqueness guarantees that the resulting presentation token, when executing the obfuscated program logic, may not leak any more information than what is explicitly revealed by the request and the response to the received request. A receiver, e.g. a verifying computer system, receiving the presentation token in response to a request sent e.g. to a user computer system which executes the obfuscated program logic with the request as input is enabled to verify the signature comprised by the presentation token with a publicly available cryptographic signing key. Thus, the receiver is enabled to verify that the provided response is a response computed for the request sent and that the response is computed from attribute values which are certified by a reliable issuing computer system having generated and issued the obfuscated program logic with a first attribute value hardcoded therein. In an example, a plurality of attribute values may be hardcoded in the obfuscated program logic enabling a user computer system executing the program logic to provide certified information about a plurality of attribute values as well as about combinations of different attribute values.

According to an example, the obfuscated program logic either further comprises a hardcoded revocation reference value or the hardcoded first attribute value is represented by a hardcoded revocation reference value, execution of the executable instructions by the processor further causes the obfuscated program logic to: receive a revocation list, the revocation list comprising a plurality of revocation list values, each value being assigned to a revocation status, evaluate the revocation status of the obfuscated program logic by evaluating whether the hardcoded revocation reference value is comprised in the revocation list, in case the revocation reference value is not comprised in the revocation list, the signature is further certifying the revocation list.

This may have the advantage that an individual obfuscated program logic indicated by the revocation reference value may easily be revoked, e.g. when an obfuscated program logic is lost or stolen. Furthermore, this may be beneficial, when attribute values change. Since attribute values are hardcoded into the obfuscated program logic, they may only be changed by generating and issuing a new obfuscated program logic with the amended attribute values hardcoded therein. An attribute value may for example be an address of a user. After moving to a new address it may become necessary to issue a new credential, i.e. obfuscated program logic. The old obfuscated program logic comprising the old address needs to be invalidated in order to prevent usage and in particular misusage of this credential certifying a wrong address. The old obfuscation program logic may be easily invalidated by adding its revocation reference value, which is hardcoded and cannot be changed, to an official revocation list, listing the revocation reference value of each revoked obfuscated program logic. By making the revocation list publicly available and regularly updating the same, an efficient scheme for evaluating the revocation status of a credential in in form of an obfuscated program logic is provided. Before generating a presentation token, the program logic may check that its revocation reference value is not included in the revocation list. In case it is included no presentation token may be generated. In case it is not included, the credential is unrevoked and a valid presentation token may be generated.

According to an example, the presentation token is provided for the purpose of gaining access to a hardware and/or software function, the obfuscated program logic further comprises a pseudo-random function and the obfuscated program logic either further comprises a hardcoded first seed value for executing the pseudo-random function or the hardcoded first attribute value is represented by a hardcoded first seed value for executing the pseudo-random function, the hardcoded first seed value being specific for the obfuscated program logic, execution of the executable instructions by the processor further causes the obfuscated program logic to: receive a second seed value for executing the pseudo-random function, the second seed value being specific for the function for which the presentation token is provided, generate a pseudonym by executing the pseudo-random function with the first and second seed value, the signature further certifying the authenticity of the pseudonym, the presentation token further comprising the pseudonym.

The presentation token may be provided for the purpose of gaining access to a hardware and/or software function. Such a function may comprise an access to a service, facility or other resource. Using two seed values in combination as an input for a pseudo-random function may have the advantage that a presentation token generated by the same program logic for the same function may be traceable to a common origin, while they remain untraceable to the presentation token generated by the same program logic, but provided for a different function. The first seed value is hardcoded and thus fixed for a given program logic. This first seed value may be a random seed value. The second seed value is specific for the function for which the presentation token is generated. This enables a computer system, for example, to access an anonymous first email account and mailing functions provided thereby, while proving that it is the same user computer system which created the account. However, when accessing an anonymous second account identified by another function specific seed value, the second account will learn nothing about the pseudonym used to access the first account. In other situations, a service providing computer system may want to impose that user computer systems can access a service anonymously, but each credential can only be used once to access the service. This might for example be advantageous for an e-Government scenario with online opinion polls: Even though the privacy of each user has to be guaranteed, the government may want to prevent that a single citizen assigned to a single credential to vote multiple times with that single credential, e.g. provided by a obfuscated program logic incorporated into an electronic ID card. A second seed value may e.g. be a URL, a section ID, a context ID, a system or network ID, a name, a serial number etc.

According to an example, the first attribute value is hardcoded in the obfuscated program logic by a first attribute commitment value generated with the first attribute value and hardcoded in the obfuscated program logic, execution of the executable instructions by the processor further causes the obfuscated program logic to: receive a first attribute opening value for the hardcoded first attribute commitment value and a first input attribute value, the first attribute opening value verifying that the first input attribute value is the first attribute value with which the first attribute commitment value was generated, evaluating with the first attribute opening value whether the first input attribute value is the first attribute value with which the first attribute commitment value was generated, in case the first input attribute value is the first attribute value with which the first attribute commitment value was generated, the evaluation whether the request is related to the hardcoded first attribute value is an evaluation whether the request is related to the received first input attribute value.

This may have the advantage that by using commitment values for hardcoding an attribute value into the obfuscated program logic, the issuing computer system which issues the program logic learns nothing about the attribute value to be hardcoded into the program logic when generating the same. Here, the attribute value is still considered to be hardcoded, since the commitment value is binding and thus unambiguously relates to a specific attribute value which may be identified using an opening value computed for the commitment value. In order to change the attribute value, the commitment value has to be changed, thus the only way to change the attribute value is again issuance of a new program logic. Thus, an attribute value is still considered to be hardcoded even though it is a commitment value which constitutes a fixed part of the program logic.

In this example a user computer system executing the obfuscated program logic has to provide the actual value and the opening information for the hardcoded commitment. These values may further be considers as keys for using the credential. Only if a computer system knows these values, it may be enabled to use the program logic. When executing the program logic, it may be checked whether a valid actual value and a valid opening information are given. If not, no presentation token is generated.

According to an example, the first seed value is hardcoded in the obfuscated program logic by a first seed commitment value generated with the first seed value and hardcoded in the obfuscated program logic in case the hardcoded first attribute value is not represented by the hardcoded first seed value, execution of the executable instructions by the processor causes the obfuscated program logic to further: receive a first seed opening value for the hardcoded first seed commitment value and a first input seed value for executing the pseudo-random function, the first seed opening value verifying that the first input seed value is the seed value with which the seed commitment value was generated, evaluating with the first seed opening value whether the first input seed value is the first seed value with which the first seed commitment value was generated, in case the first input seed value is the first seed value with which the first seed commitment value was generated, the generation of the pseudonym comprises executing the pseudo-random function with the received first input seed value.

This may also have the advantage that the actual values for which the commitments were generated remain hidden from the issuing computer system. Furthermore, only those computer systems which know the first seed value and the first seed opening value may be enabled to use the obfuscated program logic.

According to an example, execution of the executable instructions by the processor further causes the obfuscated program logic to: receive an attribute derivation function configured for deriving a derivation attribute value from the hardcoded first attribute value, receive a second attribute commitment value generated with a second attribute value derived from the hardcoded first attribute value by the attribute derivation function and receive a second attribute opening value for the second attribute commitment value, the second attribute opening value verifying that the second attribute commitment value was generated with the second attribute value, derive the derivation attribute value from the hardcoded first attribute value by executing the received attribute derivation function, evaluate with the second attribute opening value and the second attribute commitment value whether the derivation attribute value is the second attribute value with which the second attribute commitment value was generated, in case the derivation attribute value is evaluated to be the second attribute value, the signature is further certifying the authenticity of the second attribute commitment value and certifying the received attribute derivation function by which the second attribute value is derivable from the hardcoded first attribute value.

This may have the advantage that it allows transferring attribute values from a source credential to a new credential certifying the authenticity of the attribute values by the original credential. In particular, it may be possible to transfer the attribute values by using commitment values. This may be beneficial in that an issuing computer system issuing the credential with the carried over attribute values only learns that the attribute commitment values provided are commitments for attribute values of the source credential, but does not gain any knowledge about the underlying attribute values.

A first credential in form of an obfuscated program logic may for example be provided by an ID card. Based on the attributes certified and comprised by the ID card, a second credential in form of an obfuscated program logic, e.g. a library card, may be issued. Providing an attribute derivation function to a first obfuscated program logic to derive information to be carried over into a second new obfuscated program logic as well as commitment values for these information allows generation of a presentation token comprising the commitment values. In an example, an attribute value derived by the attribute derivation function may be identical with the attribute value on which the seed derivation function is applied. In another example, a derived attribute value may differ. When generating the presentation token, the obfuscated program logic verifies by executing the attribute derivation function that the provided commitment values are correct for the information derived from attribute values hardcoded in the program logic. Thus, the presentation token certifies that commitment values contained therein are the correct ones for the information to be carried over. By hardcoding the presented commitment values into a new obfuscated program logic, a second credential with the derived information as derived attribute values may be generated and used to provide certified information on the derived attribute values.

According to an example, the execution of the executable instructions by the processor further causes the obfuscated program logic to: receive a seed derivation function configured for deriving a derivation seed value from the hardcoded first seed value, receive a second seed commitment value generated with a third seed value derived from the hardcoded first seed value by the seed derivation function and receive a second seed opening value for the second seed commitment value, the second seed opening value verifying that the second seed commitment value was generated with the third seed value, derive the derivation seed value from the hardcoded first seed value by executing the received seed derivation function, evaluate with the second seed opening value and the second seed commitment value whether the derivation seed value is the third seed value with which the second seed commitment value was generated, in case the derivation seed value is evaluated to be the third seed value, the signature is further certifying the authenticity of the second seed commitment value and certifying the received seed derivation function by which the third seed value is derivable from the hardcoded first seed value.

This may have the advantage that by providing the seed derivation function to a source credential, seed values hardcoded in the source credential and/or information derived from these seed values may be easily carried over into a new credential. A presentation token generated thereby contains commitment values for the seed values and/or the information derived there from. In an example, a seed value derived by the seed derivation function may be identical with the seed value on which the seed derivation function is applied. In another example a derived seed value may differ. The generated presentation token certifies the authenticity of the contained commitment values as originating from seed values of the source credential. These commitment values may be used to issue a new credential on the seed values carried over via the commitment values.

According to an example, the execution of the executable instructions by the processor further causes the obfuscated program logic to: receive a public cryptographic inspection key, and receive a second attribute derivation function, derive a third derivation attribute value by applying the received second attribute derivation function on the hardcoded first attribute value, encrypting the third derivation attribute value with the received public cryptographic inspection key, the signature further certifying the authenticity of the encrypted third attribute value and the signature further certifying the public cryptographic inspection key and the second attribute derivation function with which the encrypted third attribute value was generated, the presentation token being generated and returned by the obfuscated program logic further comprising the encrypted third attribute value.

This may have the advantage that encrypted attribute values and/or information derived therefrom may be incorporated into a presentation token. An encryption computed with the public cryptographic inspection key may be decryptable with a secret cryptographic inspection key. Thus, an authorized entity, which is in possession of the secret cryptographic inspection key is enabled to inspect the encrypted attribute values. However, every other recipient of the presentation token who is not in possession of the secret cryptographic inspection is unable to inspect the encrypted attribute values. This allows to at least partially lift the anonymity of a presentation token in special cases like emergency cases, but to maintain anonymity otherwise. In an example the public cryptographic inspection key and the secret cryptographic inspection key may form an asymmetric cryptographic key pair.

According to an example, the hardcoded cryptographic signing key is a key credential generated with a secret cryptographic key, the secret cryptographic key and the cryptographic signature verification key forming an asymmetric cryptographic key pair, the key credential comprising the hardcoded revocation reference value, in case the revocation reference value is not comprised in the revocation list, the signature further provides verifiable evidence that the revocation value is not comprised in the revocation list.

This may have the advantage that it allows providing the hardcoded cryptographic signing key with a revocation reference value. In case the obfuscated program logic is reverse engineered and the signing key leaked, the cryptographic signing key may be revoked by adding the respective revocation reference value to the revocation list. Thereby, the cryptographic signing key and thus the obfuscated program logic in which the signing key is hardcoded are revoked. However, the cryptographic signature verification key remains valid, i.e. unrevoked. Thus, another obfuscated program logic comprising a cryptographic signing key generated with the same secret cryptographic key, but with a different revocation reference value remains unrevoked.

Since only the signing key generated with the secret cryptographic key, but not the secret cryptographic key is contained in the obfuscated program logic, even a successful reverse-engineering may only reveal the signing key, not the underlying secret cryptographic key. In case the signing key was not revocable, a leakage of the signing key would require to declare the whole signature scheme to be not valid anymore. Consequently, the signature verification key could not be used anymore and every signature referring to the signature verification key for verification would become invalid, i.e. every obfuscated program logic using this signature scheme would need to be revoked. By providing the hardcoded cryptographic signing key with a revocation reference value, the signing key may be individualized allowing revocation of an individual signing key. However, other signing keys for computing signatures which are verifiable with the same signature verification key as the revoked signing key remain valid.

According to an example, the hardcoded cryptographic signing key is a secret cryptographic key, wherein the secret cryptographic key and the cryptographic signature verification key forming an asymmetric cryptographic key pair.

This may have the advantage to provide a simple and effective signing scheme for verifying the authenticity of information provided by a presentation token generated with the obfuscated program logic.

According to an example, execution of the machine executable instructions by the processor further causes the system to: provide a revocation reference value and hardcode the revocation reference value into the executable program logic in case the hardcoded first attribute value is not represented by the hardcoded revocation reference value, the executable program logic further being configured for receiving a revocation list, the revocation list comprising a plurality of revocation list values, each value being assigned to a revocation status, evaluating the revocation status of the obfuscated program logic by evaluating whether the hardcoded revocation reference value is comprised in the revocation list, in case the revocation reference value is not comprised in the revocation list, the signature is further certifying the revocation list.

This may have the advantage that it allows to generate credentials which are individually revocable.

According to an example, the executable program logic is configured for generating the presentation token for the purpose of gaining access to a hardware and/or software function, execution of the machine executable instructions by the processor further causes the system to: either provide a first seed value for executing a pseudo-random function or the hardcoded first attribute value being represented by a first seed value for executing a pseudo-random function, the pseudo-random function being comprised by the executable program logic and the first seed value being specific for the executable program logic, hardcode the first seed value into the executable program logic in case the hardcoded first attribute value is not represented by the first seed value, the executable program logic further being configured for receiving a second seed value for executing the pseudo-random function, the second seed value being specific for the function for which the presentation token is generated, generating a pseudonym by executing the pseudo-random function with the first and second seed value, the signature further certifying the authenticity of the pseudonym, the presentation token further comprising the pseudonym.

This may have the advantage that it allows to generate credentials which enable a user computer system executing these credentials to use function specific pseudonyms. Thus, presentation token provided by the same credential for the same function may be traceable, while presentation token provided for other functions remain unlinked.

According to an example, execution of the machine executable instructions by the processor further causes the system to receive a first attribute commitment value which was generated with the first attribute value, hardcode the first attribute value into the executable program logic by hardcoding the received first attribute commitment value into the executable program logic, the executable program logic further being configured for receiving a first attribute opening value for the hardcoded first attribute commitment value and a first input attribute value, the first attribute opening value verifying that the first input attribute value is the first attribute value with which the first attribute commitment value was generated, evaluating with the first attribute opening value whether the first input attribute value is the first attribute value with which the first attribute commitment value was generated, in case the first input attribute value is the first attribute value with which the first attribute commitment value was generated, the evaluation whether the request is related to the hardcoded first attribute value is an evaluation whether the request is related to the received first input attribute value.

This may have the advantage that an issuing computer system generating the obfuscated program logic does not gain knowledge about attribute values which are hardcoded into the obfuscated program logic via commitment values provided to the issuing system, e.g. by a user computer system. Thus, only attribute commitment values are revealed to the issuing system, but not the underlying attribute values themselves.

According to an example, execution of the machine executable instructions by the processor further causes the system to: receive a first seed commitment value which was generated with the first seed value, hardcode the first seed value into the executable program logic by hardcoding the received first seed commitment value into the executable program logic, the executable program logic further being configured for receiving a first seed opening value for the hardcoded first seed commitment value and a first input seed value for executing the pseudo-random function, the first seed opening value verifying that the first input seed value is the seed value with which the seed commitment value was generated, evaluating with the first seed opening value whether the first input seed value is the first seed value with which the first seed commitment value was generated, in case the first input seed value is the first seed value with which the first seed commitment value was generated, the generation of the pseudonym comprises executing the pseudo-random function with the received first input seed value.

This may have the advantage that an issuing computer system generating the obfuscated program logic does gain knowledge about seed values which are hardcoded into the obfuscated program logic via commitment values provided to the system, e.g. by a user computer system.

According to an example, execution of the machine executable instructions by the processor further causes the system to: provide a secret cryptographic key, the secret cryptographic key and the cryptographic signature verification key forming an asymmetric cryptographic key pair, generating a key credential with the secret cryptographic key, the credential comprising the revocation reference value, in case the revocation reference value is not comprised in the revocation list, the signature further provides verifiable evidence that the revocation reference value is not comprised in the revocation list.

This may have the advantage to provide the hardcoded cryptographic signing key with a revocation reference value, the signing key may thus be individualized allowing to revoke individual signing keys. However, other signing keys for computing signatures which are verifiable with the same signature verification key as the revoked signing key remain valid.

According to an example, execution of the machine executable instructions by the processor further causes the system to: the first attribute commitment value is received by receiving a presentation token comprising the first attribute commitment value and an attribute signature, the attribute signature certifying the authenticity of the first attribute commitment value and certifying an attribute derivation function with which the first attribute commitment value was generated, evaluating with a attribute signature verification key whether the attribute signature certifies the authenticity of the received first attribute commitment value, in case the authenticity of the first attribute commitment value is verified hardcoding the received first attribute commitment value into the executable program logic.

This may have the advantage that a attribute value may be carried over from another obfuscated program logic by a presentation token generated with the other obfuscated program logic comprising a attribute commitment value generated with the attribute value to be carried over. The presentation token may verify the authenticity of the attribute values carried over. Thus, an issuing computer system generating the obfuscated program logic only learns that the attribute commitment values are authentic, but not the attribute values with which the commitments have been generated. This may provide a high level of confidentiality regarding attribute values hardcoded into the obfuscated program logic.

According to an example, execution of the machine executable instructions by the processor further causes the system to: the first seed commitment value is received by receiving a presentation token comprising the first seed commitment value and a seed signature, the seed signature certifying the authenticity of the first seed commitment value and certifying a seed derivation function with which the first seed commitment value was generated, evaluating with a seed signature verification key whether the seed signature certifies the authenticity of the received first seed commitment value, in case the authenticity of the first seed commitment value is verified hardcoding the received first seed commitment value into the executable program logic.

This may have the advantage that a seed value may be carried over from another obfuscated program logic by a presentation token generated with the other obfuscated program logic comprising a seed commitment value generated with the seed value to be carried over. The presentation token may verify the authenticity of the seed values carried over. Thus, an issuing computer system generating the obfuscated program logic only learns that a seed commitment values is authentic, but not the seed value with which the commitment has been generated. This may provide a high level of confidentiality regarding seed values hardcoded into the obfuscated program logic.

Privacy-ABC schemes build from code obfuscation may allow the user computer system to evaluate and prove arbitrary predicates over attributes, i.e. attribute values, certified by a credential. Such predicts are provided to the user computer system by verifying computer systems. The user computer system may thus be enabled to reveal and prove any derived information from the attribute values. For example, if two of the attribute values embedded in a credential encode the credential's expiration date and the date of birth of the user to whom the user computer systems is assigned, the predicate may require that the credential is not expired, i.e. the expiration date is later than the current date, while the derived information may reveal the age group of the user computer system in ten-year intervals. As another example, if the credential contains the user's height h and weight w as attribute values, then the derived information could reveal the user's body mass index $BMI=w/h^2$.

FIG. 1 is a schematic diagram of an exemplary system executing methods for generating and handling credentials, in particular Privacy-ABCs from code obfuscation with arbitrary attribute functions. To issue a credential for attribute values $(a_1, a_2, \ldots, a_n)$, an issuing computer system 100 prepares and obfuscates an executable program logic C, resulting in an obfuscated executable program logic $\tilde{C}$. The credential, more precisely the Privacy-ABC, is given by this obfuscated program logic: cred=$\tilde{C}$, wherein the attributes $a_1, \ldots, a_n$ are hardcoded into the program logic.

The credential, i.e. obfuscated executable program logic $\tilde{C}$, is provided to a user computer system 200. When executed by the user computer system 200, the obfuscated program logic $\tilde{C}$ generates a presentation token pt revealing information inf about the attribute values $(a_1, \ldots, a_n)$ embedded in the obfuscated program logic $\tilde{C}$. The user computer system 200 selects which information about which one of the hardcoded attributes $a_1, \ldots, a_n$ is revealed in a presentation token generated using the obfuscated program logic $\tilde{C}$. The user computer system 200 may receive requests in form of policies $Pol_1, \ldots, Pol_n$ from verifying computer systems 1, ..., n. The policies $Pol_1$, $Pol_n$ provided by verifying computer systems 300 and 300', identify the information about the attributes $a_1, \ldots, a_n$ required by the verifying computer systems 300 and 300'. In case the user computer system 200 decides to reveal the required information, it creates a presentation token $pt_l$ and $pt_n$ for each verifying computer systems 300 and 300' by evaluating the obfuscated program logic $\tilde{C}$, i.e. its credential cred=$\tilde{C}$, on the received policies $Pol_1$ and $Pol_n$, i.e. by executing $pt_1 \leftarrow \tilde{C}(Pol_1)$ and $pt_n \leftarrow \tilde{C}(Pol_n)$. Presentation token $pt_1$ which is provided to verifying computer systems 300 in response to policies $Pol_1$ requesting information $inf(a_1)$ about attribute value $a_1$ hardcoded in the obfuscated program logic $\tilde{C}$ may reveal the requested information together with a signature σ identifying the request $Pol_1$ for which the response $inf(a_1)$ was generated and verifying the authenticity of the response to $inf(a_1)$. The signature a is computed with the secret cryptographic key isk, the secret cryptographic key isk and public cryptographic key ipk forming an asymmetric key pair, i.e. a signature σ computed with isk is verifiable with ipk. The secret cryptographic key isk is hardcoded into the obfuscated program logic $\tilde{C}$ issued by the issuing computer system 100 to the user computer system 200, while the public cryptographic key ipk is made available to verifying computer systems 300 and 300'. In response to policies $Pol_n$ from verifying computer systems 300' requesting information $inf(a_2)$ about attribute value $a_2$, the presentation token $pt_n$ revealing the requested information may be provided. To verify the presentation token $pt_1$ and $pt_n$, the verifying computer systems 300 and 300', respectively, may verify the received presentation token by checking that SVerify(ipk, $Pol_1\|inf(a_1),\sigma)=1$ and $SVerify(ipk,Pol_n\|inf(a_2),\sigma)=1$, respectively. The presentation token $pt_1$ and $pt_n$ provided to different verifying computer systems 300 and 300' are unlinkable with each other and thus not traceable to a common origin.

Hardcoding in general refers to the software development practice of embedding data directly into a source code of a program or other executable object, instead of obtaining that data from external sources or generating data in the program itself with a given input. Here, hardcoding not only refers to data values directly embed a source code, but also to such data values which are predetermined by the source code such that only the predetermined data value is accepted as a valid input. This includes data values generated in the program itself with a given input as long as the data value generated is predetermined by the source code of the program. Therefore, a data value may be considered hardcoded in a source code, if the data value itself is embedded into the source code or if e.g. a commitment value is embedded committing to the data value, wherein the commitment value is binding for the data value, i.e. it cannot be chanced afterwards. In other words, in order to change a data value hardcoding requires into a program's source code requires to change the source code any time the data value is to be changed.

Generally, code obfuscation is a tool that renders executable software code unintelligible, in the sense that the internal structure and data of the code can no longer be inspected, while preserving the functionality of the code. Programs known as obfuscators 10 may transform readable plain text code into obfuscated code using various known techniques. A program obfuscator 10 is a sort of compiler that takes a program as input and produces another program as output, i.e. the obfuscated program.

Figure 2:
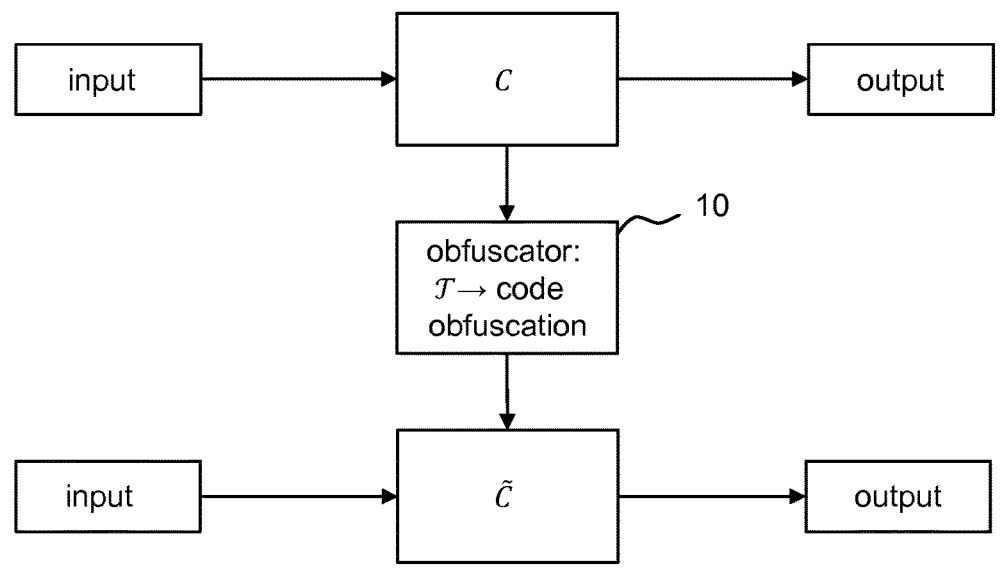
FIG. 2 depicts a schematic block diagram illustrating code obfuscation.

FIG. 2 is a schematic diagram illustrating code obfuscation. An computer-implemented executable program C is code obfuscated by an obfuscator 10 applying a transformation $\mathcal{T}$ to the source code of C. This transformation results in an obfuscated program logic $\tilde{C}$ which is still executable but unintelligible for any adversary. Thus, providing the same input to the program C and the obfuscated program logic $\tilde{C}$ results into the same output.

An obfuscation scheme $O$ for a family of program logic classes $\{C\}$ is an algorithm Obf that, on input security parameter $\kappa$ and a program C, generates an obfuscated program logic $\tilde{C} \leftarrow Obf(1^\kappa, C)$. The obfuscated program $\tilde{C}$ has the same functionality as C, meaning that for all is $\kappa \in \mathbb{N}$, for every program $C \in \{C\}$, and for all inputs x we have that $$Pr[\tilde{C}(x)=C(x):\tilde{C} \leftarrow Obf(1^\kappa,C)]=1.$$

Thus, the obfuscation scheme is such that the obfuscated program logic $\tilde{C}$ does not reveal any information about the internal structure of C.

An obfuscator 10 may in general satisfy the following conditions: functionality, efficiency and obfuscation. Functionality implies that the obfuscated program should have the same functionality, i.e. the same input/output behavior, as the input program. Efficiency implies that the obfuscated program is not significantly less efficient than the input program. An obfuscated program may have some overhead, but this should not result in a significant, e.g. exponential, increase in run times compared with the input program. Obfuscation implies that even if the code of the original program was very easy to understand, say, possessing meaningful comments, function and variable names, and a modular design, then still the code of the obfuscated program should be hard to understand.

Obfuscation may further be defined as follows: Transforming a program C consisting of source code objects $[S_1, \ldots, S_n]$, e.g. classes, methods, statements, etc., by applying a obfuscating transformations $\mathcal{T} = \{\mathcal{T}_1, \ldots, \mathcal{T}_n\}$ results in a code obfuscated program logic $\tilde{C} = \{\ldots, \tilde{S}_j = \mathcal{T}_i(S_j), \ldots\}$. The resulting obfuscated program logic $\tilde{C}$ shows the same observable behavior as C, i.e. the transformations are semantics-preserving. The obscurity of $\tilde{C}$ is significantly increased, i.e. understanding and reverse engineering $\tilde{C}$ will be strictly more time-consuming than understanding and reverse engineering C. The resilience of each transformation $\mathcal{T}_i(S_j)$ is significantly increased, i.e. it will either be difficult to construct an automatic tool to undo the transformations or executing such a tool will be extremely time-consuming. The stealth of each transformation $\mathcal{T}_i(S_j)$ is significantly increased, i.e. the statistical properties of $\tilde{S}_j$ are similar to those of $S_j$. Code obfuscation may be considered to be is very similar to code optimization, except that, with code obfuscation, in general obscurity is maximizing while minimizing execution time, whereas, with code optimization, just execution time is minimized.

An upper bound on the time needed by an adversary to reverse engineer a program C is the time needed to do a black-box study of C, i.e. study the input-output relations of C along with the time needed to encode the discovered relations in a new program logic. Most malicious reverse engineers may further attempt to do a white-box study of C, i.e. they will decompile and examine the code itself. The ultimate goal of code obfuscation is to construct $\tilde{C}$, i.e. an obfuscated version of C, for which a white-box study will yield no useful information. In other words, by obfuscating a code the actual time needed to reverse engineer $\tilde{C}$ approaches the upper bound needed to reverse engineer C. Thus, obfuscation may make reading and reverse-engineering a program difficult and time-consuming, but not necessarily impossible. Even so obfuscation in the sense that a code should be indistinguishable from a black box may not be achieved for every kind of code, it is it is in general possible to use known obfuscation to make a program logic unintelligible. Examples for various obfuscation methods are e.g. given by Christian S. Collberg and Clark Thomborson in "Watermarking, tamper-proofing, and obfuscation-tools for software protection" in Software Engineering, IEEE Transactions on, 28(8):735-746, 2002, and by Sanjam Garg, Craig Gentry, Shai Halevi, Mariana Raykova, Amit Sahai, and Brent Waters in "Candidate indistinguishability obfuscation and functional encryption for all circuits", 54th FOCS, pages 40-49, IEEE Computer Society Press, October 2013.

Figure 3:
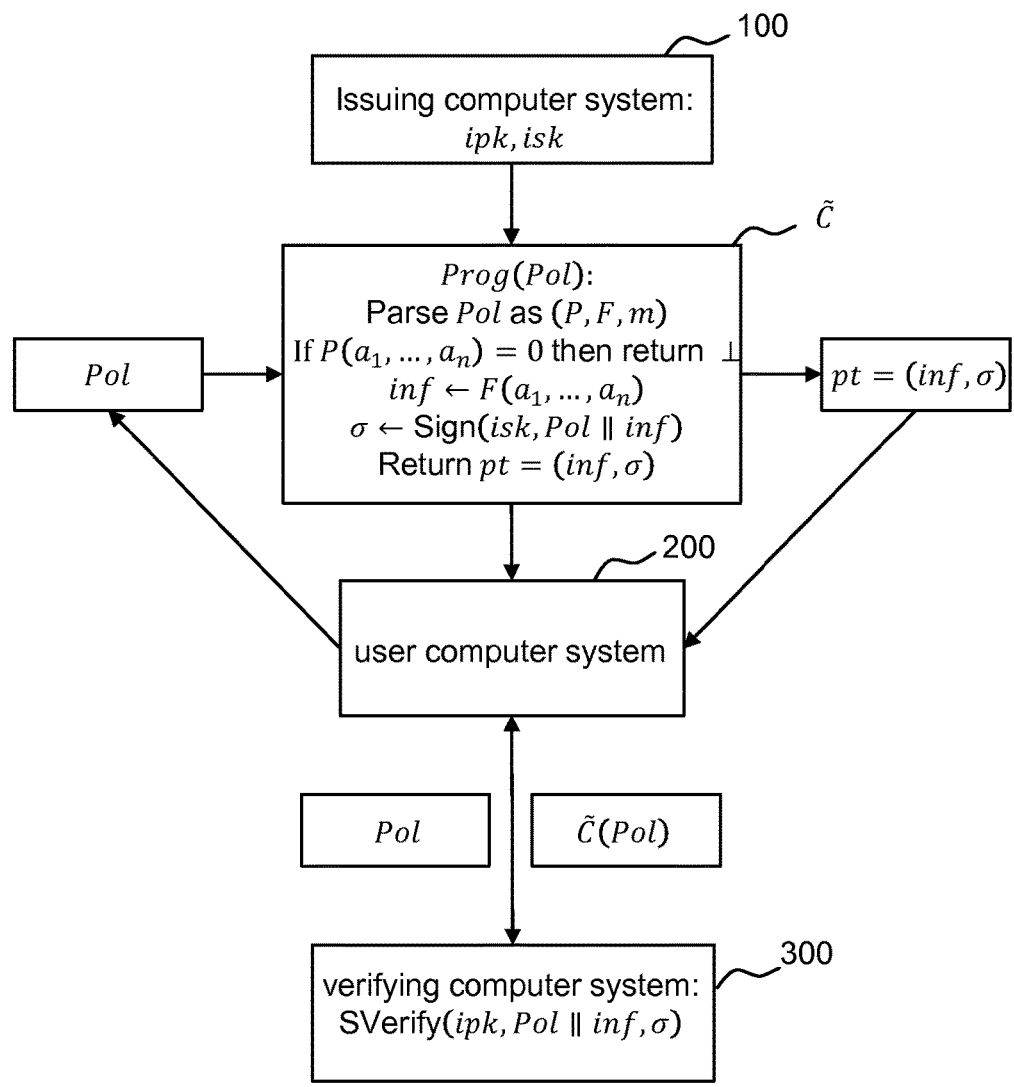
FIG. 3 depicts a schematic block diagram illustrating a first exemplary method.

FIG. 3 depicts a schematic block diagram illustrating a first exemplary method. A policy Pol provided by a verifying computer system 100 may express arbitrary predicates that the requested attribute values have to satisfy and arbitrary information derived from the attribute values to be revealed. Information may be anonymously revealed within Privacy-ABC scheme $\mathcal{P}\mathcal{ABC} = (IKg, Issue, Present, Verify)$ consists of the following algorithms: The issuing computer system 300 starts by generating an issuance key pair $(ipk, isk) \leftarrow IKg(1^\kappa)$. This key pair is used to generate unique signatures.

Unique signatures may be implemented by a digital signature scheme $\mathcal{S} = (SKg, Sign, SVerify)$, where $(pk, sk) \leftarrow SKg(1^\kappa)$ generates an asymmetric key pair for security parameter $\kappa$ consisting of a public key pk and a secret key sk. The signer computes a signature for a message m as $\sigma \leftarrow Sign(sk, m)$, which can later be verified by running $b \leftarrow SVerify(pk, m, \sigma)$, which gives $b=1$, if the signature is valid and b=0 otherwise. The signature scheme is required to be unique in the sense that for each message m∈{0,1}* and for each public key pk, there exists only a single signature σ such that SVerify(pk,m,σ)=1.

The issuing computer system 300 further generates a credential for attribute values $a_1, \ldots, a_n \in \{0,1\}^*$ by running cred←Issue(isk,($a_1, \ldots, a_n$)) and sends the credential over a secure channel to the user computer system 200. When authenticating to a verifying computer system 300, the verifying computer system 300 may first send a policy encoded as polynomial-size program logic P and F forming a pair Pol=(P,F,m) to the user computer system 200, where $P:(\{0,1\}^*)^n \rightarrow \{0,1\}$ implements the predicate that must be satisfied by the attribute values, $F:(\{0,1\}^*)^n \rightarrow \{0,1\}^*$ implements the function that describes the information that needs to be revealed about the attribute values, and m may be context information that needs to be authenticated during the presentation, e.g., containing a nonce to prevent replay attacks or the verifying computer system's 300 identity to prevent man-in-the-middle attacks. The user computer system 200 then computes the presentation token pt←Present (cred,Pol) and sends pt back to verifying computer system 300. The verifying computer system 300 uses the issuing computer system's 100 public key ipk to check the validity of the presentation token pt and extract the derived information inf←Verify(ipk,Pol,pt), or obtains inf=⊥, i.e. a contradiction, if the presentation token is invalid.

The method may comprise key generation by the issuing computer system 100: The key pair of the issuing computer system 100 may consists of a key pair for a standard signature scheme (ipk,isk)←SKg($1^\kappa$).

Credential issuing by the issuing computer system 100: To issue a credential for attribute values ($a_1, \ldots, a_n$), issuing computer system 100 prepares a program C that evaluates the following program Prog:

Prog(Pol):
Parse Pol as (P,F,m)
If $P(a_1, \ldots, a_n)$=0 then return ⊥
inf←$F(a_1, \ldots, a_n)$
σ←Sign(isk,Pol∥inf)
Return pt=(inf,σ)

The credential is an obfuscation of this program logic: cred=C̃←Obf($1^\kappa$,C) with the issuance secret key isk, i.e. cryptographic signing key, and the attribute values $a_1, \ldots, a_n$ hardcoded into the program logic. Here, ∥ denotes concatenation.

Presentation of a presentation token pt by the user computer system 200 in response to a request Pol by a verifying computer system 300: The user computer system 100 creates a presentation token pt by evaluating the obfuscated program logic C̃, i.e. its credential cred=C̃, on the policy Pol received from the verifying computer system 300, i.e., pt←C̃(Pol). If pt≠⊥, i.e. not contradictive, the user computer system 200 sends pt to the verifying computer system 300.

Verification of the presentation token presented by the user computer system 200 to the verifying computer system 300: To verify the presentation token pt, the verifying computer system 300 parses pt=(inf,σ) and evaluates whether SVerify(ipk,Pol∥inf,σ)=1. If so, then it returns the derived information inf, otherwise it returns ⊥.

By the uniqueness of the signature σ, the presentation token cannot leak any more information than what is explicitly revealed by Pol and inf. Note that without uniqueness, the issuing computer system 100 could cheat by letting the randomness used in signature creation leak information about the user computer system 200.

Figure 4:
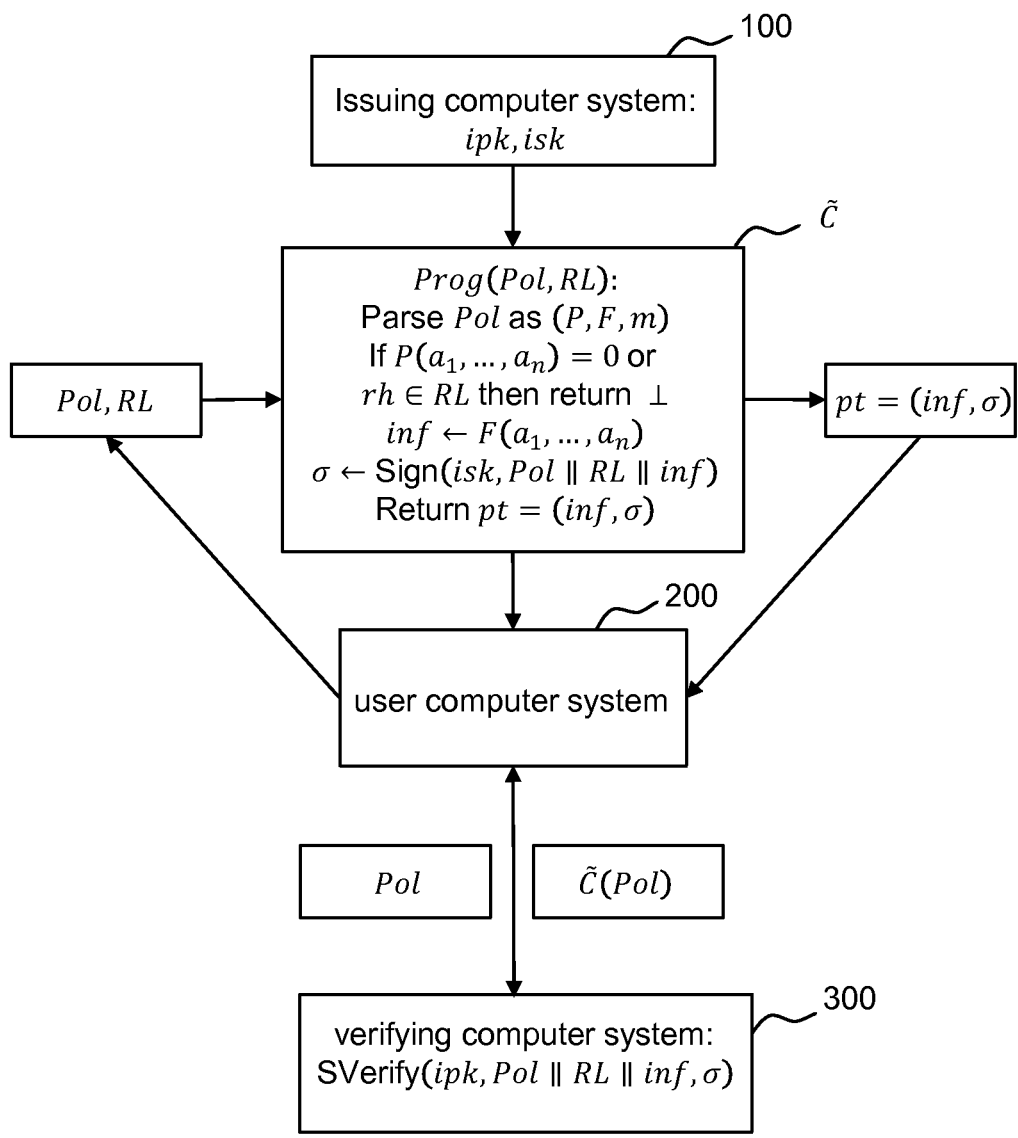
FIG. 4 depicts a schematic block diagram illustrating a second exemplary method.

FIG. 4 depicts a schematic block diagram illustrating a second exemplary method. This method allows for an individual obfuscated program logic C̃ to be revoked, e.g. when a obfuscated program logic C̃ is lost or stolen. A revocation reference value, e.g. in form of a unique identifier or revocation handle rh, is hardcoded into each program C by the issuing computer system 100 before obfuscation and a revocation list RL is published that contains all revocation handles of revoked credentials, i.e. obfuscated program logic C̃, in case of a blacklist. Before creating a presentation token pt, the program logic C̃ checks that its hardcoded revocation handle rh is not included in the revocation list RL being a blacklist and given as input to program logic C̃ by the user computer system 200. If revocation handle rh is not included the program logic C̃, signs RL in the presentation token pt. A credential then may become an obfuscated version C̃ of the following program C:

Prog(Pol,RL).
Parse Pol as (P,F,m)
If $P(a_1, \ldots, a_n)$=0 or rh∈RL then return ⊥
inf←$F(a_1, \ldots, a_n)$
σ←Sign(isk,Pol∥RL∥inf)
Return pt=(inf, σ)

At verification, the verifying computer system 300 checks that the signature σ was created for the current revocation list RL by checking that SVerify(ipk,Pol∥RL∥inf,σ)=1.

Figure 5:
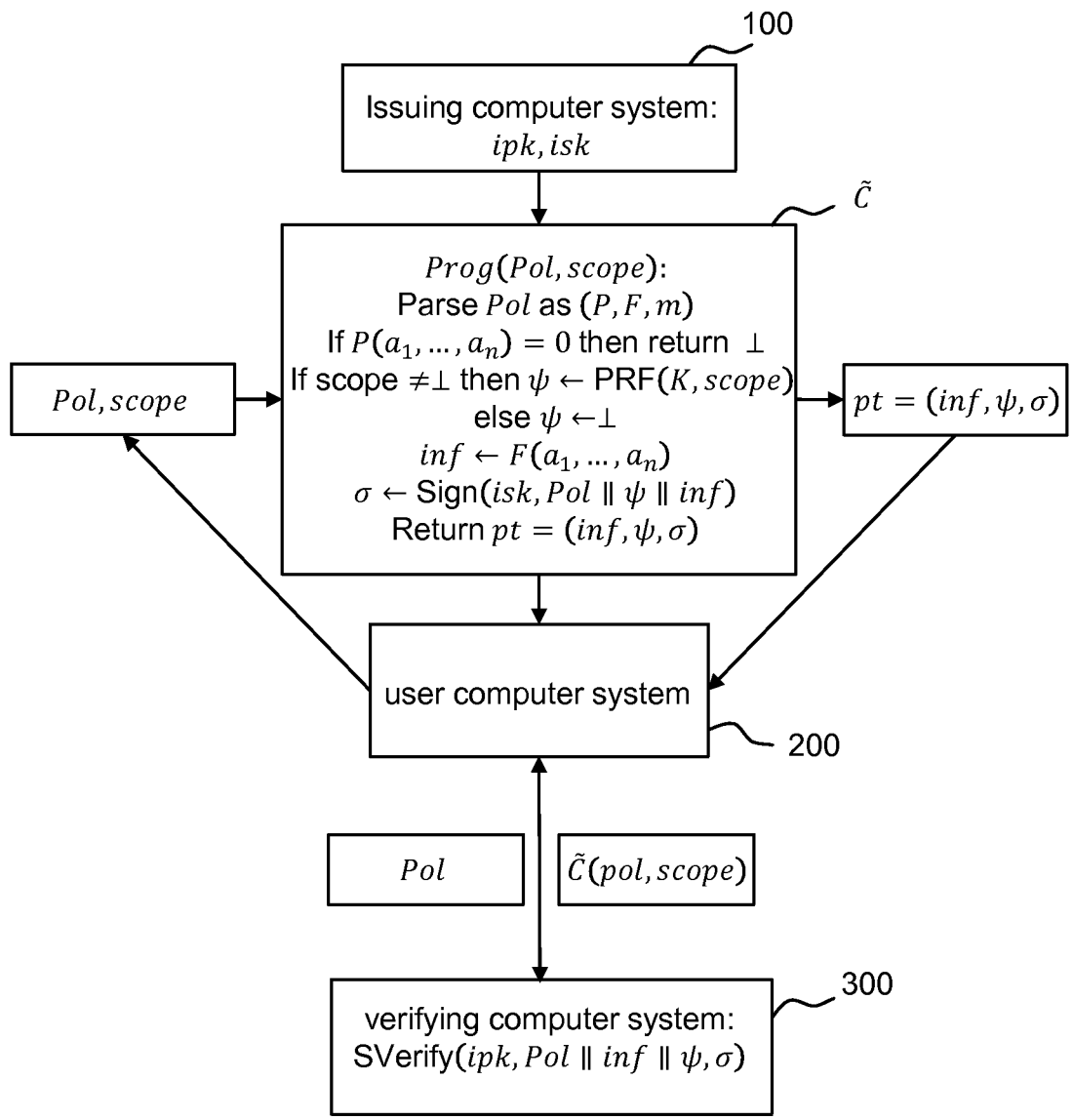
FIG. 5 depicts a schematic block diagram illustrating a third exemplary method.

FIG. 5 depicts a schematic block diagram illustrating a third exemplary method allowing the generating of pseudonyms. In certain situations, the user computer system 200 may want to be verifiably linkable to a previous presentation, i.e. a presentation token provided should be identifiable to origin from the same credential as a previously provided presentation token. For example, to access an anonymous email address, the user computer system 200 may want to prove that it is the same user computer system 200 which created the account. In other situations, the verifying computer system 200 may want to impose that user computer systems 200 can access a service anonymously, but each credential can only be used once to access the service. This might for example be advantageous for an e-Government scenario with online opinion polls: the government may want to protect voters' privacy, i.e. the user computer systems' 200, but prevent that a single citizen assigned to a single credential, i.e. program logic C̃ allowing him or her to participate in the vote, gets to vote multiple times with a single program logic C̃, e.g. provided by a electronic identity card. For such applications function-exclusive pseudonyms may be beneficial.

Function-exclusive pseudonyms are a special type of pseudonyms, where each user computer system 200 can only generate a single pseudonym ψ for a function specific string scope, but remains untraceable across different function specific strings. In the opinion poll example above, one could e.g. use the URL of the opinion poll as the function specific string, enforcing that each citizen can vote only once, without compromising anonymity at other polls or websites. Ordinary, i.e. non-function-exclusive pseudonyms, may easily been obtained from function-exclusive ones by letting the user computer system 200 randomly choose part of the function specific string.

Function-exclusive pseudonyms may be added by hardcoding a first seed value, e.g. a pseudo-random function key K for a pseudo-random function PRF into each credential, letting the pseudonym be computed as ψ←PRF(K, scope), and signing ψ in the presentation token pt. A second seed value being specific for a function for which a presentation token is generated may be given by a function specific string scope. More precisely, a credential is the obfuscation $\tilde{C}$ of the following program C:

Prog(Pol,scope):
Parse Pol as (P,F,m)
If $P(a_1, \ldots, a_n)=0$ then return $\perp$
If scope$\neq \perp$ then $\psi \leftarrow$ PRF(K,scope) else $\psi \leftarrow \perp$
inf$\leftarrow F(a_1, \ldots, a_n)$
$\sigma \leftarrow$ Sign(isk,Pol$\|\psi\|$inf)
Return pt=(inf,$\psi$,$\sigma$)

At verification, the verifying computer system 300 checks that the signature $\sigma$ is valid for the claimed pseudonym $\psi$. The pseudo-randomness of the function PRF guarantees that the pseudonyms of the same user computer system 200 across different functions are untraceable.

Figure 6:
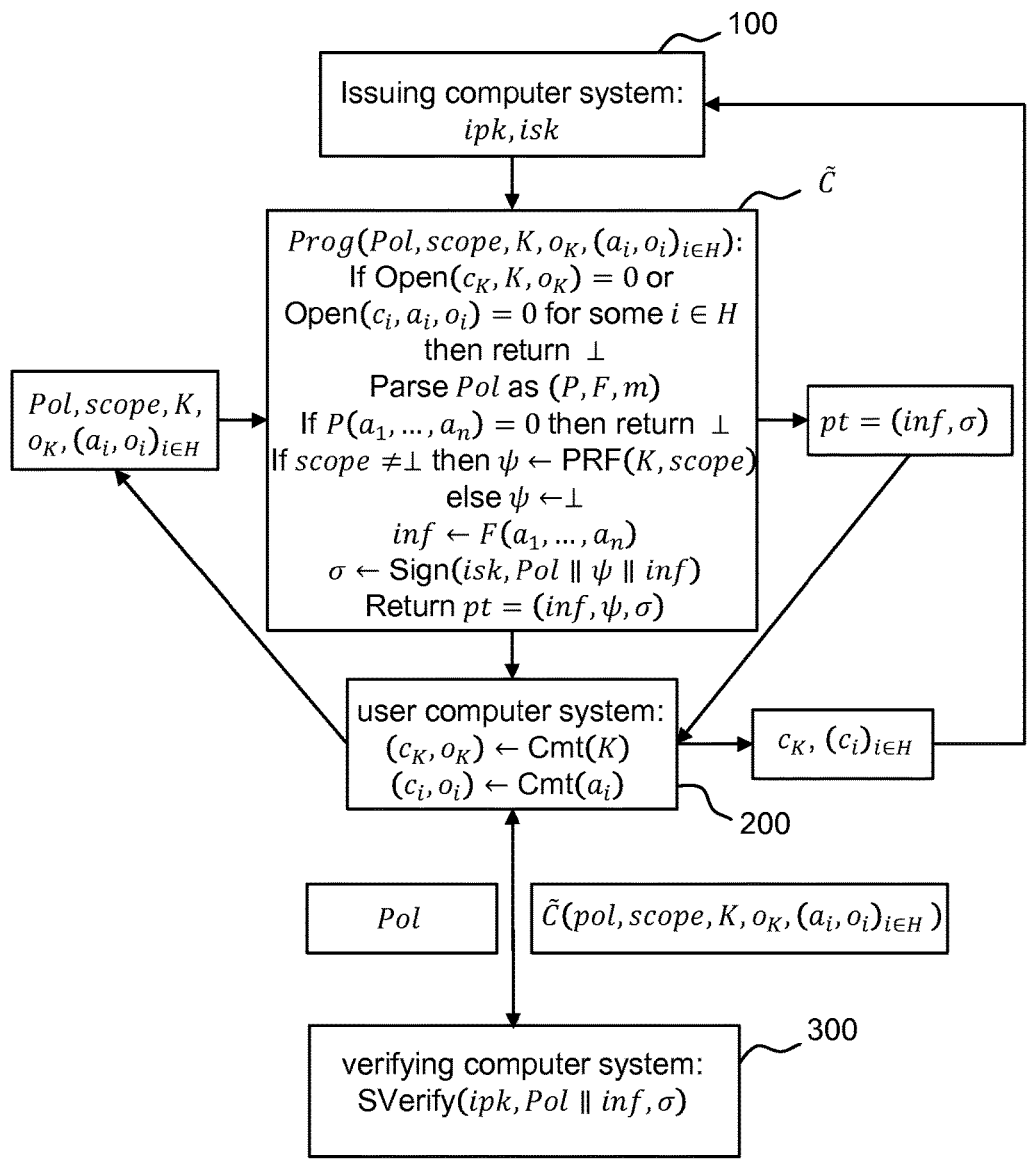
FIG. 6 depicts a schematic block diagram illustrating a fourth exemplary method.

FIG. 6 depicts a schematic block diagram illustrating a forth exemplary method allowing for hiding attribute values and pseudo-random function keys from the issuing computer system 100. In the examples given before, the issuing computer system 100 is able to issue an obfuscated program logic $\tilde{C}$ for any user computer system 200, and can therefore impersonate any user computer system 200. To prevent this, a user computer system 200 needs to have some secret key K that remains hidden from the issuing computer system 100, but that is somehow bound to the obfuscated program logic $\tilde{C}$ issued by the computer system 100. The credential, i.e. obfuscated program logic $\tilde{C}$, should be useless without the user computer system's 200 secret key K, but at the same time its use should not leave any traces that would allow to link the presentation tokens by the same user computer system 200. Also, the issuing computer system 100 may be willing to let the user computer system 200 choose certain attribute values and sign them blindly in the credential. This can be achieved by hardcoding the keys and attribute values into the program C in form of cryptographic commitments to those keys and/or attribute values. To use the obfuscated program logic $\tilde{C}$, the user computer system 200 must provide the actual value and the opening information for the commitment as input to the program logic $\tilde{C}$.

A commitment scheme $\mathcal{CMT}$ =(Cmt,Open) may consist of a commitment algorithm that, on input a message $m \in \{0,1\}^*$, returns a tuple (c,o)$\leftarrow$Cmt(m) consisting of a commitment c and opening information o. To open a commitment, the opener, i.e. the user computer system 200, reveals m and o. The verifying computer system 300 then runs Open(c,m,o) which returns 1 if the opening is valid and 0 otherwise. In terms of security, the commitment scheme needs be hiding in the sense that c does not leak any information about m, and binding in the sense that it is hard to come up with a commitment c, two different messages m$\neq$m', and two openings o, o' such that Open(c,m,o)=Open(c,m',o')=1.

The user computer device 200 may keep its pseudo-random function key K as a secret key and the attribute values $(a_i)_{i \in H}$ hidden from the issuing computer system 100 during issuance. However, attributes $(a_i)_{i \in V}$ may be visible to the issuing computer system 100, where $H \cup V=\{1, \ldots, n\}$ and $H \cap V=\emptyset$. The user computer system 200 creates commitments $(c_K,o_K)\leftarrow$Cmt(K) and $(c_i,o_i)\leftarrow$Cmt($a_i$) for all $i \in H$ and sends the commitment values $c_K$, $(c_i)_{i \in H}$ to the issuing computer system 100, so that the latter can return an obfuscation $\tilde{C}$ of the following program C:

Prog(Pol,scope,K,$o_K$,$(a_i,o_i)_{i \in H}$):
If Open($c_K$,K,$o_K$)=0 or Open($c_i$,$a_i$,$o_i$)=0 for some $i \in H$
then return $\perp$
Parse Pol as (P,F,m)
If $P(a_1, \ldots, a_n)=0$ then return $\perp$
If scope$\neq \perp$ then $\psi \leftarrow$ PRF(K,scope) else $\psi \leftarrow \perp$
inf$\leftarrow F(a_1, \ldots, a_n)$
$\sigma \leftarrow$ Sign(isk,Pol$\|\psi\|$inf)
Return pt=(inf,$\psi$,$\sigma$)

The credential cred$\leftarrow \tilde{C}$(Pol,scope,K,$o_K$,$(a_i,o_i)_{i \in H}$) now also the key K, hidden attributes $(a_i)_{i \in H}$, and all openings $o_K$,$(o_i)_{i \in H}$ to commitments. These additional values have to be provided by the user computer system 200 in order to be able to use the program logic $\tilde{C}$. The verification procedure may be the same as outlined above. The values of K, $(a_i)_{i \in H}$ are only hardcoded into the obfuscated program logic $\tilde{C}$ in form of the commitments $c_K$, $(c_i)_{i \in H}$.

Figure 7:
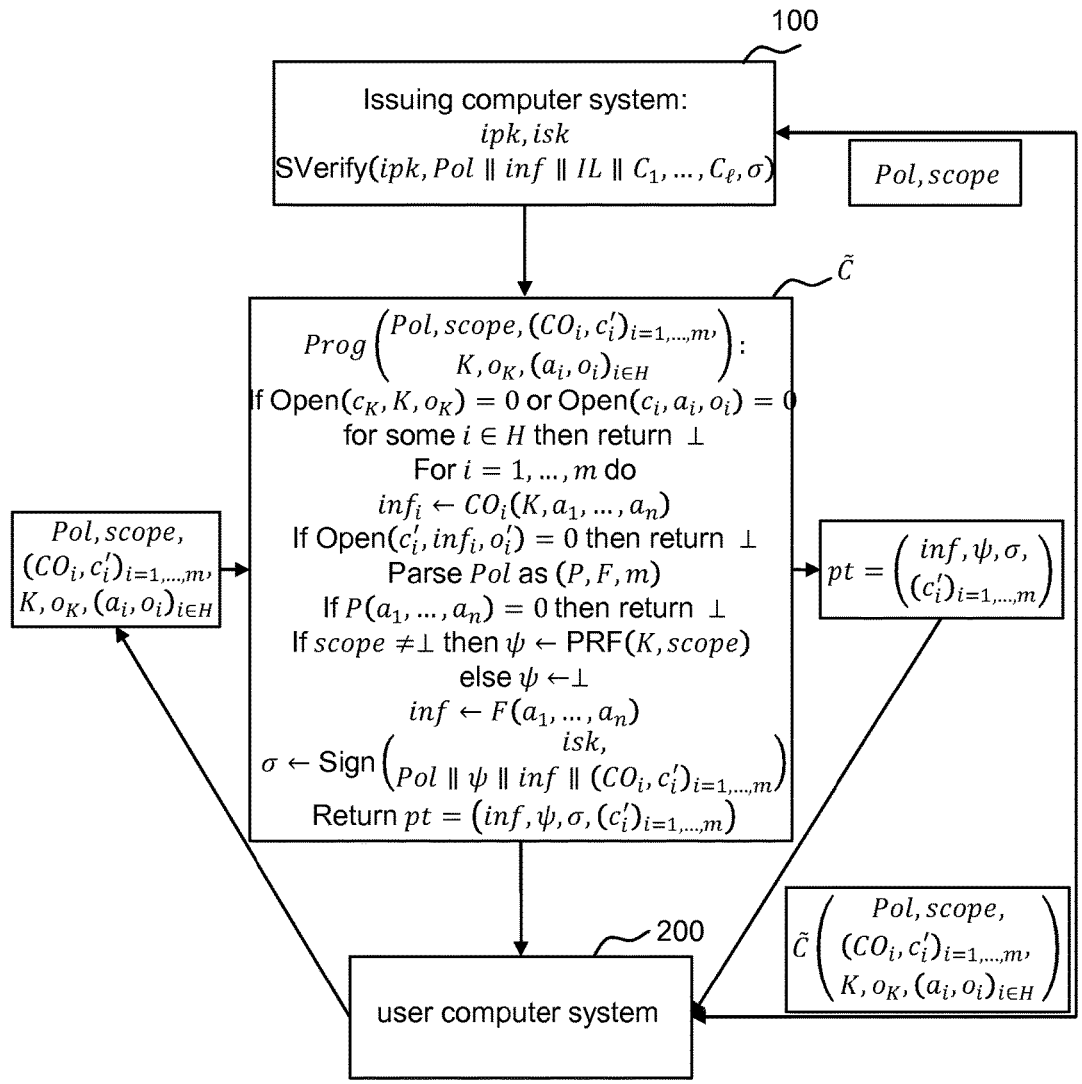
FIG. 7 depicts a schematic block diagram illustrating a fifth exemplary method.

FIG. 7 depicts a schematic block diagram illustrating a fifth exemplary method allowing transferring keys and attributes from existing credentials to newly issued credentials, i.e. obfuscated program logic $\tilde{C}$. Transferring keys and attributes from existing credentials is enabled without the issuing computer system 100 learning those keys or attributes. Meaning, the issuing computer system 100 learns that the attribute value or key that is to be embedded in a new credential is the same as the one hardcoded in an existing obfuscated program logic $\tilde{C}$. But the issuing computer system 100 does not learn the value of one of those keys or attributes carried over. This feature may be added to by letting the obfuscated program logic $\tilde{C}$ sign commitments to keys, attributes, or even any information derived from the attributes and/or keys hardcoded in the program logic $\tilde{C}$, and using the above outlined mechanism for hidden attributes to embed those commitments into a new obfuscated program logic $\tilde{C}$, i.e. additional obfuscated program logic.

In particular, let for example $CO_i:(\{0,1\}^*)^{n+1} \rightarrow \{0,1\}^*$ for $i=1, \ldots, m$ be a set of functions, attribute and/or seed derivation functions, that compute the derived information $\inf_i \leftarrow CO_i(K, a_1, \ldots, a_i)$ that will be carried over into a new credential, i.e. attribute and/or key (data) derivation functions. To start an issuance with transferring keys and/or attributes values, the user computer system 200 starts by computing $\inf_i \leftarrow (CO_i(K, a_1, \ldots, a_i)$ and creates commitments $(c'_i,o'_i)\leftarrow$Cmt($\inf_i$). The credential comprising keys and/or attributes values to be carried over in hardcoded form may be a obfuscated version $\tilde{C}$ of the following program logic C:

Prog(Pol,scope,$(CO_i,c'_i)_{i=1, \ldots, m}$,K,$o_K$,$(a_i,o_i)_{i \in H}$):
If Open($c_K$,K,$o_K$)=0 or Open($c_i$,$a_i$,$o_i$)=0 for some $i \in H$
then return $\perp$
For i=1, \ldots, m do
$\inf_i \leftarrow CO_i(K, a_1, \ldots, a_n)$
If Open($c'_i$,$\inf_i$,$o'_i$)=0 then return $\perp$
Parse Pol as (P,F,m)
If $P(a_1, \ldots, a_n)=0$ then return $\perp$
If scope$\neq \perp$ then $\psi \leftarrow$ PRF(K,scope) else $\psi \leftarrow 1$
inf$\leftarrow F(a_1, \ldots, a_n)$
$\sigma \leftarrow$ Sign(isk,Pol$\|\psi\|$inf$\|(CO_i,c'_i)_{i=1, \ldots, m}$)
Return pt=(inf,$\psi$,$\sigma$,$(c'_i)_{i=1, \ldots, m}$)

The user computer system 200 (the issuing computer system 100 if it is provided with Pol,scope, $(CO_i,c'_i)_{i=1, \ldots, m}$,K,$o_K$,$(a_i,o_i)_{i \in H}$) may execute the above obfuscated program logic $\tilde{C}$ and provide the issuing computer system 100 with the presentation token pt revealing the $(c'_i)_{i=1, \ldots, m}$ for the keys and/or attributes values to be carried over. The issuing computer system 100 may parse and verify the presentation token by checking that SVerify (ipk,Pol$\|\psi\|$inf$\|(CO_i,c'_i)_{i=1, \ldots, m}$,$\sigma$)=1. Then, issuing computer system 100 may embed the commitments $c'_i, \ldots, c'_m$ into a new obfuscated program logic $\tilde{C}$ as explained above for blind issuing.

Figure 8:
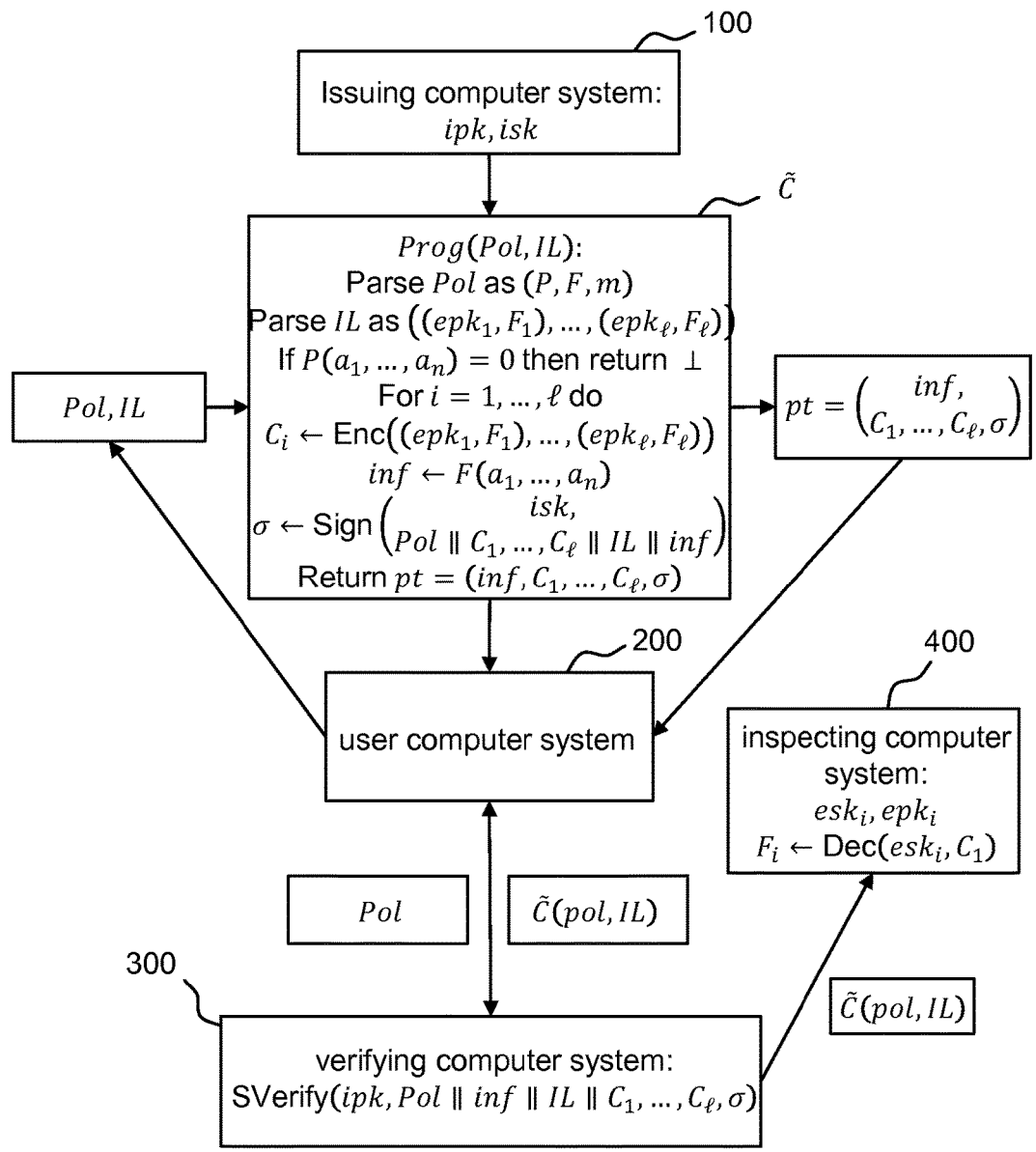
FIG. 8 depicts a schematic block diagram illustrating a sixth exemplary method.

FIG. 8 depicts a schematic block diagram illustrating a sixth exemplary method allowing inspection of certain attribute values of the by an inspecting computer system 400. In some scenarios, it may be desirable to allow a designated party, i.e. an inspecting computer system 400 which may be an independent party or which may be identical to or associated with a verifying computer system 300. The inspector inspecting computer system 400 generates a public inspection key epk of a special encryption scheme so that, at presentation, the user computer system 200 is enabled to encrypt one or more of its attribute values under this public key epk and prove to the verifying computer system 300 that a presentation token pt contains the correct attribute value as certified by the issuing computer system 100 in the obfuscated program logic $\tilde{C}$.

Inspection may be performed with a public-key encryption scheme $\mathcal{PKE}$ =(EKg,Enc,Dec), and it may be made more powerful by not only allowing attribute values to be encrypted, but any type of information derived from the attribute values hardcoded in the obfuscated program logic $\tilde{C}$. The program to be obfuscated may take an additional input that e.g. is a list IL of tuples (($epk_1$,$F_1$), . . . , ($epk_l$,$F_l$)), where each $epk_i$ is the public inspection key of an inspecting computer system 400 and $F_i$ is a function over the attribute values, the result of which must be encrypted to the inspecting computer system 400. The resulting list of ciphertexts $C_1$, . . . , $C_l$ is also signed in the presentation token pt. More precisely, the issuing computer system may create an obfuscation $\tilde{C}$ of the following program logic C:

Prog(Pol,IL):
Parse Pol as (P,F,m)
Parse IL as (($epk_1$,$F_1$), . . . , ($epk_l$,$F_l$))
If P($a_1$, . . . , $a_n$)=0 then return ⊥
For i=1, . . . , l do
    $C_1$←Enc(($epk_1$,$F_1$), . . . , ($epk_l$,$F_l$))
inf←F($a_1$, . . . , $a_n$)
σ←Sign(isk, Pol||IL||$C_1$, . . . , $C_l$|inf)
Return pt=(inf, $C_1$, . . . , $C_l$, σ)

At verification, the verifying computer system 300 checks that the signature a is valid for the claimed ciphertexts $C_1$, . . . , $C_l$. To inspect a token, an inspecting computer system 400 uses its decryption key $esk_i$ to decrypt the appropriate ciphertext $C_i$.

Figure 9:
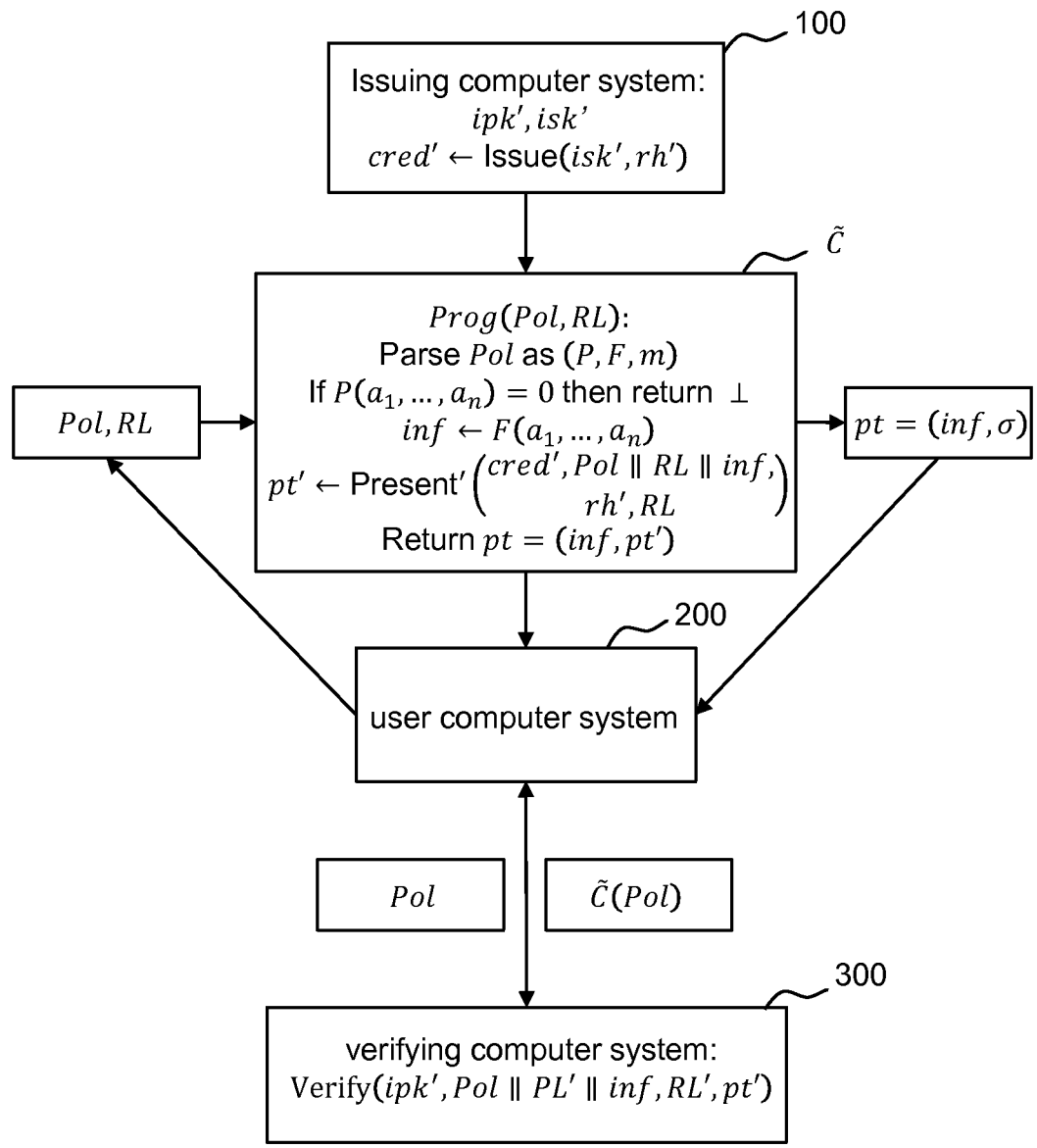
FIG. 9 depicts a schematic block diagram illustrating a seventh exemplary method.

FIG. 9 depicts a schematic block diagram illustrating a seventh exemplary method. According to this example, cryptographic signing key in form of a credential derived from a secret cryptographic key is hardcoded into the obfuscated program logic $\tilde{C}$. The secret cryptographic key isk' and the cryptographic signature verification key ipk' forming an asymmetric cryptographic key pair, thus enabling a verifying computer system 300 to verify with cryptographic signature verification key ipk' a signature in form of a presentation token pt' computed with the secret cryptographic key isk'.

If an adversary ever manages to reverse-engineer the obfuscated program logic $\tilde{C}$, then in the above described examples, the master issuance key isk may leaked. The security of the entire system collapses at that moment, as the adversary can issue credentials, e.g. in form of an obfuscated program logic $\tilde{C}$, with any attribute values and any revocation handles of his choice. The only option to recover from this situation is to revoke the issuing computer system's 100 public key ipk itself, thereby invalidating every obfuscated program logic $\tilde{C}$ issued previously, and to require each user computer systems 200 to reobtain a new obfuscated program logic $\tilde{C}$ with the attribute values assigned the user computer systems 200 under a new issuance key.

To mitigate the damage in case of reverse-engineering, instead of embedding isk into each obfuscated circuit, a classical non-obfuscation-based Privacy-ABC credential cred' may be embedded that does not have any attributes, but that is revokable with revocation handle rh' assigned to the credential cred'. This way, if an obfuscated program logic $\tilde{C}$ ever gets reverse-engineered, only the credential cred' is leaked, which does not compromise the security of the issuance key isk'. One can then simply revoke the revocation handle rh' of the compromised credential cred', without affecting the security of all other deployed obfuscated program logic $\tilde{C}$. Still, the overall construction with an obfuscated program logic $\tilde{C}$ preserves the added advantage of being able to prove any efficiently computable predicates P and derived information F about the attribute values.

More precisely, let $\mathcal{P} \mathcal{ABC}$ '=(IKg',Issue',Present',Verify') be a Privacy-ABC scheme with revocation. The revocation scheme may be built into the presentation algorithm Present', meaning, Present' takes as additional inputs an revocation reference value, i.e. revocation handle rh', and a current revocation list RL'. The revocation list RL' may be a blacklist listing all revoked revocation handle. By comparing a specific revocation handle rh' with the elements of the revocation list RL', it may be evaluated whether the credential comprising the revocation handle rh' has been revoked. In case of a blacklist the credential is revoked, if the revocation list RL' comprises the revocation handle rh' otherwise it is unrevoked. The presentation token pt'←Present'(cred',Pol',rh',RL') certifies that a non-revoked credential, as per RL', satisfies a policy Pol', and can be verified by checking that Verify(ipk',Pol',RL',pt')=1. As there are no attributes in the credential cred', the policy is limited to a simple bit string that is signed during the presentation. Such Privacy-ABC schemes may be built by combining a signature scheme with zero-knowledge protocols with an anonymous revocation scheme.

The issuing computer system 100 of the present example scheme generates a key pair(ipk',isk')←IKg'($1^\kappa$) for the non obfuscated Privacy-ABC scheme and uses them as public and private cryptographic key for the obfuscation based scheme. When asked to issue an obfuscated program logic $\tilde{C}$ on attributes ($a_1$, . . . , $a_n$), the issuing computer system generates a revocation handle rh' and issues a new credential cred'←Issue(isk',rh') using the private cryptographic key isk'. The final credential, comprising the credential cred' as a cryptographic signing key, is an obfuscated version $\tilde{C}$ of the following program logic C:

Prog(Pol,RL'):
Parse Pol as (P,F,m)
If P($a_1$, . . . , $a_n$)–0 then return ⊥
inf←F($a_1$, . . . , $a_n$)
pt' Present'(cred',Pol||RL'||inf,rh',RL')
Return pt–(inf,pt')

To verify the presentation token pt, the verifying computer system 300 outputs inf, if Verify(ipk',Pol||PL'||inf,RL', pt')=1, or outputs ⊥ otherwise. Here, the presentation token pt' computed with the credential cred' acts a signature signing Pol||RL'||inf.

Figure 10:
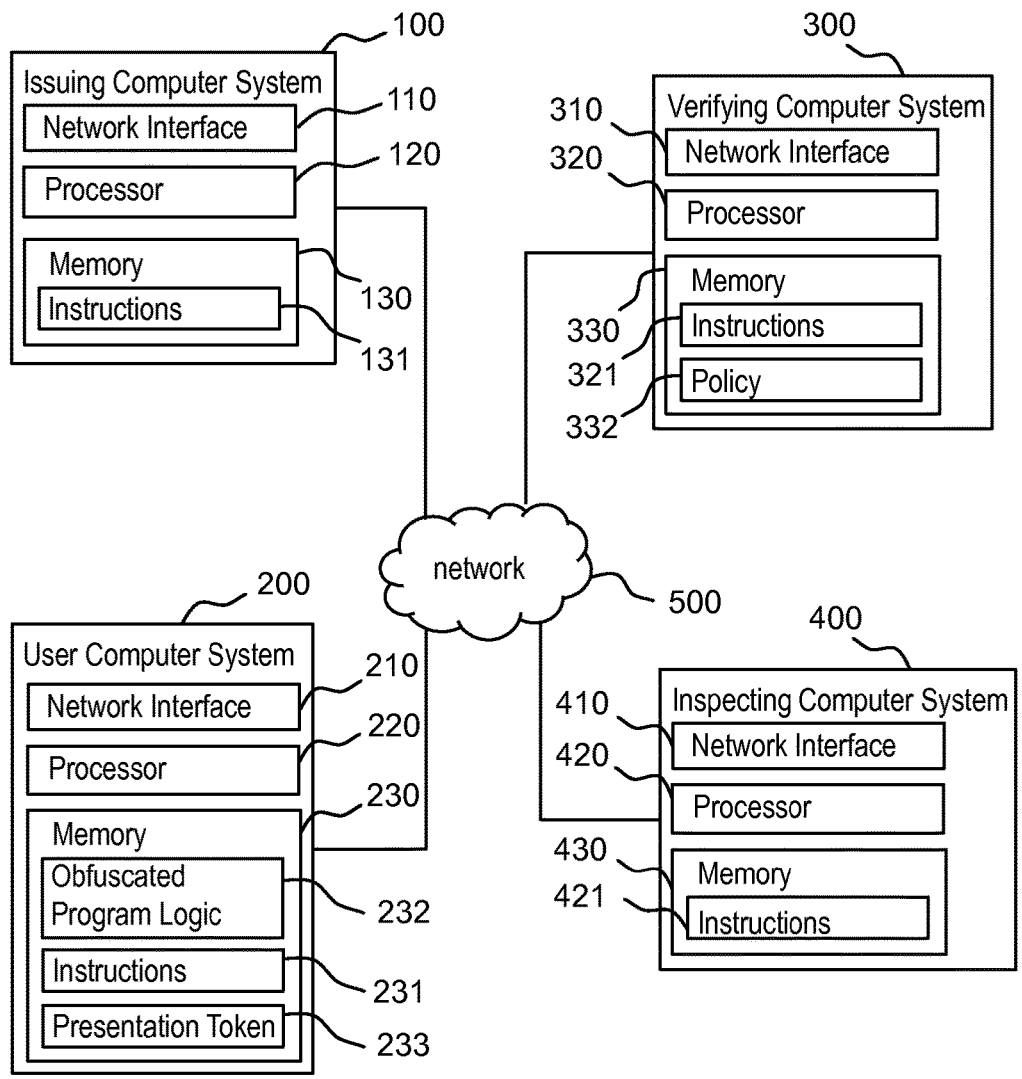
FIG. 10 depicts a schematic block diagram illustrating an exemplary computer system.

FIG. 10 shows a schematic diagram of exemplary computer systems which may be used for executing the methods of generating and applying credentials. In FIG. 10 exemplary issuing computer system 100, user computer system 200, verifying computer system 300 and inspecting computer system 400 are depicted. These computer systems 100,

200, 300, 400 are each connected to a network 500 via which data is transmitted between these computer systems 100, 200, 300, 400 like a obfuscated program logic $\tilde{C}$, a public key of the issuing computer system ipk, a request Pol, a revocation list RL, an inspection list IL, commitment values $c_K$, $(c_i)_{i \in H}$, a presentation token pk etc. For connecting to the network 500, each computer system comprises a network interface 110, 210, 310, 410. The computer systems 100, 200, 300, 400 each comprise comprising a memory 130, 230, 330, 430, i.e. a computer data storage, for storing machine executable instructions 131, 231, 331, 431 and a processor 120, 220, 320, 420 for executing the executable instructions 131, 231, 331, 431 and in particular methods of generating and applying credentials. Furthermore, data generated by and transmitted between the computer systems 100, 200, 300, 400 may be stored in the memories 130, 230, 330, 430.

Execution of the executable instructions 121 by the processor 120 may cause the issuing computer system 100 to generate an obfuscated program logic $\tilde{C}$ and provide the obfuscated program logic $\tilde{C}$ to user computer system 200. The user computer system 200 may store the obfuscated program logic $\tilde{C}$ 232 as a credential in its memory 230. The verifying computer system 300 may generate a policy Pol 332 by executing the executable instructions 321 by the processor 320 and store the policy Pol 332 in the memory 330. The policy Pol 332 may be provided to the user computer system 200. Execution of the executable instructions 221 by the processor 220 of the user computer system 200 may, in response to the request Pol received from the verifying computer system 300, cause the obfuscated program logic $\tilde{C}$ 232 to generate and return a presentation token pt 233, stored in the memory 230. The presentation token pt is send to the verifying computer system 300 as a response to the policy Pol. The verifying computer system 300 further identifies with the public key of the issuing computer system ipk the request for which the response was computed and verifies the authenticity of the response by checking the signature σ which the presentation token pt presented to the verifying computer system 300 comprises. The respective signature was computed with the cryptographic signing key hardcoded in the obfuscated program logic $\tilde{C}$, wherein the signature computed with the cryptographic signing key is verifiable with a cryptographic signature verification key in form of the public key of the issuing computer system ipk. The identity of the user computer system 200 may be inspected by the inspecting computer device 400. The presentation token pt may be presented to inspecting computer device 400 e.g. by the verifying computer system 300. The inspecting computer device 400 inspects the presentation token pt by executing the executable instructions 421 by the processor 420, i.e. decrypting the results of the function $F_i$ over the attribute values $(a_1, \ldots, a_n)$ with a secret cryptographic inspection key $esk_i$. The secret cryptographic inspection key $epk_i$ for encrypting the function $F_i$ by the user computer system 200 may have been provided by the inspecting computer system 400 via the network 500. Verifying computer system 300 and inspecting computer system 400 may be separated systems, combined in one computer system or be implemented by the same computer system.

It is understood that the computer devices and system shown in FIG. 10 may comprise more computer elements than the ones depicted. Further, more data and/or instructions may be stored in the memories 130, 230, 330, and 430. Finally, although only one issuing computer system 100, one user computer system 200, one verifying computer system 300 and one inspecting computer system 400 are shown as examples, an implementation of the methods for generating and applying credentials may comprise more computer systems communicating via the network 500.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
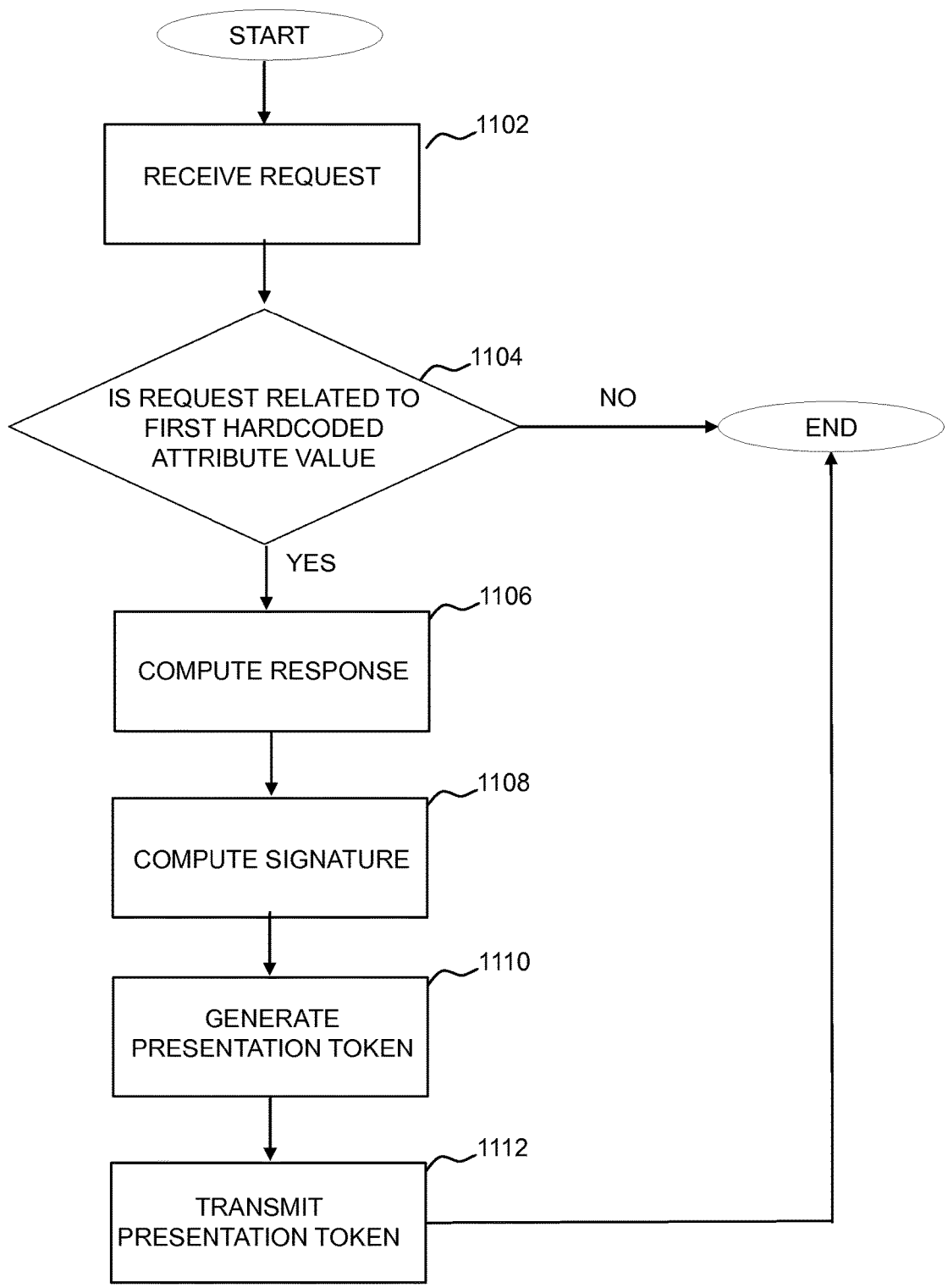
FIG. 11 depicts a flowchart illustrating a first exemplary method.

FIG. 11 is a flowchart illustrating a first exemplary method. The program receives a request identifying the attributes necessary for access to a resource (step 1102). User computer 200 evaluates the request and determines whether the request is related to a hardcoded first attribute value (decision 1104). If the request is not related to a hardcoded first attribute value (decision 1104 "NO" branch), then the program ends. If the request is related to a hardcoded first attribute value (decision 1104 "YES" branch), then the program utilizes the hardcoded first attribute value to compute a response to the request (step 1106). The program also computes a signature to verify the authenticity of the response (step 1108). The program generates a presentation token as part of the response containing both the response and signature (step 1110). The program then transmits the presentation token to a verifying computer system (step 1112).

What is claimed is:

1. A method for generating a privacy preserving attribute based credential in the form of an obfuscated executable program logic, the method comprising:
   providing a cryptographic signing key;
   generating an executable program logic;
   hardcoding the cryptographic signing key and a first attribute value into the executable program logic;
   obfuscating the generated executable program logic;
   providing the obfuscated executable program logic to a receiver computer system, wherein the executable program logic is configured to receive a request and in response to receiving the request evaluate whether the request is related to the hardcoded first attribute value; and
   based on the request being related to the hardcoded first attribute value:
      computing with the hardcoded first attribute value a response to the request,
      computing with the cryptographic signing key a signature, wherein the signature certifies the request for which the response was computed and certifies the authenticity of the response, and
      generating and returning a presentation token comprising the response and the signature.

2. The method of claim 1, further comprising:
   providing a revocation reference value;
   hardcoding the revocation reference value into the executable program logic; and
   based on the hardcoded first attribute value is not being represented by the hardcoded revocation reference value:
      receiving a revocation list, wherein the revocation list comprises one or more revocation list values, and wherein each of the one or more revocation list values is assigned to a revocation status;
      evaluating the revocation status of the obfuscated program logic by evaluating whether the hardcoded revocation reference value is comprised in the revocation list; and
      based on the revocation reference value not being comprised in the revocation list, the signature is further certifying of the revocation list.

3. The method of claim 2, further comprising:
   providing a secret cryptographic key, wherein the secret cryptographic key and the cryptographic signature verification key form an asymmetric cryptographic key pair;
   generating a key credential with the secret cryptographic key, wherein the key credential comprises the revocation reference value; and
   based on the revocation reference value not being comprised in the revocation list, the signature further provides verifiable evidence that the revocation reference value is not comprised in the revocation list.

4. The method of claim 1, further comprising:
providing at least one of a first seed value for executing a pseudo-random function or a hardcoded first attribute value represented by a first seed value for executing a pseudo-random function, wherein the pseudo-random function is comprised of the executable program logic and the first seed value is specific for the executable program logic; and
based on the hardcoded first attribute value not being represented by the first seed value, hardcoding the first seed value into the executable program logic, wherein the executable program logic is further configured for:
  receiving a second seed value for executing the pseudo-random function, and wherein the second seed value is specific for the function for which the presentation token is generated, and wherein the presentation token is generated for the purpose of gaining access to at least one of a hardware and software function, and
  generating a pseudonym by executing the pseudo-random function with the first and second seed value, wherein the signature further certifies the authenticity of the pseudonym, and the presentation token further comprises the pseudonym.

5. The method of claim 4, further comprising:
receiving a first seed commitment value which was generated with the first seed value;
hardcoding the first seed value into the executable program logic by hardcoding the received first seed commitment value into the executable program logic, wherein the executable program logic further being configured for:
  receiving a first seed opening value for the hardcoded first seed commitment value and a first input seed value for executing the pseudo-random function, wherein the first seed opening value verifies that the first input seed value is the seed value with which the seed commitment value was generated,
  evaluating with the first seed opening value whether the first input seed value is the first seed value with which the first seed commitment value was generated; and
  based on the first input seed value being the first seed value with which the first seed commitment value was generated, generating of the pseudonym comprises executing the pseudo-random function with the received first input seed value.

6. The method of claim 5, further comprising:
receiving the first seed commitment value by receiving a presentation token comprising the first seed commitment value and a seed signature, wherein the seed signature certifies the authenticity of the first seed commitment value and certifies a seed derivation function with which the first seed commitment value was generated;
evaluating with a seed signature verification key whether the seed signature certifies the authenticity of the received first seed commitment value; and
based on the authenticity of the first seed commitment value being verified, hardcoding the received first seed commitment value into the executable program logic.

7. The method of claim 1, further comprising:
receiving a first attribute commitment value which was generated with the first attribute value; and
hardcoding the first attribute value into the executable program logic by hardcoding the received first attribute commitment value into the executable program logic, wherein the executable program logic further being configured for:
  receiving a first attribute opening value for the hardcoded first attribute commitment value and a first input attribute value, wherein the first attribute opening value verifies that the first input attribute value is the first attribute value with which the first attribute commitment value was generated,
  evaluating with the first attribute opening value whether the first input attribute value is the first attribute value with which the first attribute commitment value was generated; and
  based on the first input attribute value being the first attribute value with which the first attribute commitment value was generated, evaluating whether the request is related to the hardcoded first attribute value by evaluating whether the request is related to the received first input attribute value.

8. The method of claim 7, further comprising:
receiving the first attribute commitment value by receiving a presentation token comprising the first attribute commitment value and an attribute signature, wherein the attribute signature certifies the authenticity of the first attribute commitment value and certifies that an attribute derivation function with which the first attribute commitment value was generated;
evaluating with an attribute signature verification key whether the attribute signature certifies the authenticity of the received first attribute commitment value; and
based on the authenticity of the first attribute commitment value being verified, hardcoding the received first attribute commitment value into the executable program logic.

9. A computer program product for generating a privacy preserving attribute based credential in the form of obfuscated executable program logic, the computer program product comprising:
one or more computer-readable storage media and program instructions stored on the one or more computer-readable storage media, the program instructions comprising:
  program instructions to provide a cryptographic signing key;
  program instructions to generate an executable program logic;
  program instructions to hardcode the cryptographic signing key and a first attribute value into the executable program logic;
  program instructions to obfuscate the generated executable program logic;
  program instructions to provide the obfuscated executable program logic to a receiver computer system, wherein the executable program logic is configured to receive a request and in response to receiving the request evaluate whether the request is related to the hardcoded first attribute value; and
  based on the request being related to the hardcoded first attribute value:
    program instructions to compute with the hardcoded first attribute value a response to the request,
    program instructions to compute with the cryptographic signing key a signature, wherein the signature certifies the request for which the response was computed and certifies the authenticity of the response, and program instructions to generate and return a presentation token comprising the response and the signature.

10. The computer program product of claim 9, further comprising:

program instructions to provide a revocation reference value;

program instructions to hardcode the revocation reference value into the executable program logic; and based on the hardcoded first attribute value is not being represented by the hardcoded revocation reference value:

program instructions to receive a revocation list, wherein the revocation list comprises one or more revocation list values, and wherein each of the one or more revocation list values is assigned to a revocation status;

program instructions to evaluate the revocation status of the obfuscated program logic by evaluating whether the hardcoded revocation reference value is comprised in the revocation list; and based on the revocation reference value not being comprised in the revocation list, the signature is further certifying of the revocation list.

11. The computer program product of claim 10, further comprising:

program instructions to provide a secret cryptographic key, wherein the secret cryptographic key and the cryptographic signature verification key form an asymmetric cryptographic key pair;

program instructions to generate a key credential with the secret cryptographic key, wherein the key credential comprises the revocation reference value; and based on the revocation reference value not being comprised in the revocation list, the signature further provides verifiable evidence that the revocation reference value is not comprised in the revocation list.

12. The computer program product of claim 9, further comprising:

program instructions to provide at least one of a first seed value for executing a pseudo-random function or a hardcoded first attribute value represented by a first seed value for executing a pseudo-random function, wherein the pseudo-random function is comprised of the executable program logic and the first seed value is specific for the executable program logic; and based on the hardcoded first attribute value not being represented by the first seed value, program instructions to hardcode the first seed value into the executable program logic, wherein the executable program logic is further configured for:

program instructions to receive a second seed value for executing the pseudo-random function, and wherein the second seed value is specific for the function for which the presentation token is generated, and wherein the presentation token is generated for the purpose of gaining access to at least one of a hardware and software function, and program instructions to generate a pseudonym by executing the pseudo-random function with the first and second seed value, wherein the signature further certifies the authenticity of the pseudonym, and the presentation token further comprises the pseudonym.

13. The computer program product of claim 12, further comprising:

program instructions to receive a first seed commitment value which was generated with the first seed value;

program instructions to hardcode the first seed value into the executable program logic by hardcoding the received first seed commitment value into the executable program logic, wherein the executable program logic further being configured for:

program instructions to receive a first seed opening value for the hardcoded first seed commitment value and a first input seed value for executing the pseudo-random function, wherein the first seed opening value verifies that the first input seed value is the seed value with which the seed commitment value was generated, program instructions to evaluate with the first seed opening value whether the first input seed value is the first seed value with which the first seed commitment value was generated; and based on the first input seed value being the first seed value with which the first seed commitment value was generated, program instructions to generate of the pseudonym comprises executing the pseudo-random function with the received first input seed value.

14. The computer program product of claim 13, further comprising:

program instructions to receive the first seed commitment value by receiving a presentation token comprising the first seed commitment value and a seed signature, wherein the seed signature certifies the authenticity of the first seed commitment value and certifies a seed derivation function with which the first seed commitment value was generated;

program instructions to evaluate with a seed signature verification key whether the seed signature certifies the authenticity of the received first seed commitment value; and based on the authenticity of the first seed commitment value being verified, program instructions to hardcode the received first seed commitment value into the executable program logic.

15. The computer program product of claim 9, further comprising:

program instructions to receive a first attribute commitment value which was generated with the first attribute value; and program instructions to hardcode the first attribute value into the executable program logic by hardcoding the received first attribute commitment value into the executable program logic, wherein the executable program logic further being configured for:

program instructions to receive a first attribute opening value for the hardcoded first attribute commitment value and a first input attribute value, wherein the first attribute opening value verifies that the first input attribute value is the first attribute value with which the first attribute commitment value was generated, program instructions to evaluate with the first attribute opening value whether the first input attribute value is the first attribute value with which the first attribute commitment value was generated; and based on the first input attribute value being the first attribute value with which the first attribute commitment value was generated, program instructions to evaluate whether the request is related to the hardcoded first attribute value by evaluating whether the request is related to the received first input attribute value.

16. The computer program product of claim 15, further comprising:
program instructions to receive the first attribute commitment value by receiving a presentation token comprising the first attribute commitment value and an attribute signature, wherein the attribute signature certifies the authenticity of the first attribute commitment value and certifies that an attribute derivation function with which the first attribute commitment value was generated;
program instructions to evaluate with an attribute signature verification key whether the attribute signature certifies the authenticity of the received first attribute commitment value; and
based on the authenticity of the first attribute commitment value being verified, program instructions to hardcode the received first attribute commitment value into the executable program logic.

17. A computer system for generating a privacy preserving attribute based credential in the form of an obfuscated executable program logic, the computer system comprising:
one or more computer processors, one or more computer-readable storage media, and program instructions stored on one or more of the computer-readable storage media for execution by at least one of the one or more processors, the program instructions comprising:
program instructions to provide a cryptographic signing key;
program instructions to generate an executable program logic;
program instructions to hardcode the cryptographic signing key and a first attribute value into the executable program logic;
program instructions to obfuscate the generated executable program logic;
program instructions to provide the obfuscated executable program logic to a receiver computer system, wherein the executable program logic is configured to receive a request and in response to receiving the request evaluate whether the request is related to the hardcoded first attribute value; and
based on the request being related to the hardcoded first attribute value:
program instructions to compute with the hardcoded first attribute value a response to the request,
program instructions to compute with the cryptographic signing key a signature, wherein the signature certifies the request for which the response was computed and certifies the authenticity of the response, and
program instructions to generate and return a presentation token comprising the response and the signature.

18. The computer system of claim 17, further comprising:
program instructions to provide a revocation reference value;
program instructions to hardcode the revocation reference value into the executable program logic; and
based on the hardcoded first attribute value is not being represented by the hardcoded revocation reference value:
program instructions to receive a revocation list, wherein the revocation list comprises one or more revocation list values, and wherein each of the one or more revocation list values is assigned to a revocation status;
program instructions to evaluate the revocation status of the obfuscated program logic by evaluating whether the hardcoded revocation reference value is comprised in the revocation list; and
based on the revocation reference value not being comprised in the revocation list, the signature is further certifying of the revocation list.

19. The computer system of claim 18, further comprising:
program instructions to provide a secret cryptographic key, wherein the secret cryptographic key and the cryptographic signature verification key form an asymmetric cryptographic key pair;
program instructions to generate a key credential with the secret cryptographic key, wherein the key credential comprises the revocation reference value; and
based on the revocation reference value not being comprised in the revocation list, the signature further provides verifiable evidence that the revocation reference value is not comprised in the revocation list.

20. The computer system of claim 17, further comprising:
program instructions to provide at least one of a first seed value for executing a pseudo-random function or a hardcoded first attribute value represented by a first seed value for executing a pseudo-random function, wherein the pseudo-random function is comprised of the executable program logic and the first seed value is specific for the executable program logic; and
based on the hardcoded first attribute value not being represented by the first seed value, program instructions to hardcode the first seed value into the executable program logic, wherein the executable program logic is further configured for:
program instructions to receive a second seed value for executing the pseudo-random function, and wherein the second seed value is specific for the function for which the presentation token is generated, and wherein the presentation token is generated for the purpose of gaining access to at least one of a hardware and software function, and
program instructions to generate a pseudonym by executing the pseudo-random function with the first and second seed value, wherein the signature further certifies the authenticity of the pseudonym, and the presentation token further comprises the pseudonym.

21. The computer system of claim 20, further comprising:
program instructions to receive a first seed commitment value which was generated with the first seed value;
program instructions to hardcode the first seed value into the executable program logic by hardcoding the received first seed commitment value into the executable program logic, wherein the executable program logic further being configured for:
program instructions to receive a first seed opening value for the hardcoded first seed commitment value and a first input seed value for executing the pseudo-random function, wherein the first seed opening value verifies that the first input seed value is the seed value with which the seed commitment value was generated,
program instructions to evaluate with the first seed opening value whether the first input seed value is the first seed value with which the first seed commitment value was generated; and based on the first input seed value being the first seed value with which the first seed commitment value was generated, program instructions to generate of the pseudonym comprises executing the pseudo-random function with the received first input seed value.

22. The computer system of claim 21, further comprising:
program instructions to receive the first seed commitment value by receiving a presentation token comprising the first seed commitment value and a seed signature, wherein the seed signature certifies the authenticity of the first seed commitment value and certifies a seed derivation function with which the first seed commitment value was generated;
program instructions to evaluate with a seed signature verification key whether the seed signature certifies the authenticity of the received first seed commitment value; and
based on the authenticity of the first seed commitment value being verified, program instructions to hardcode the received first seed commitment value into the executable program logic.

23. The computer system of claim 17, further comprising:
program instructions to receive a first attribute commitment value which was generated with the first attribute value; and
program instructions to hardcode the first attribute value into the executable program logic by hardcoding the received first attribute commitment value into the executable program logic, wherein the executable program logic further being configured for:
program instructions to receive a first attribute opening value for the hardcoded first attribute commitment value and a first input attribute value, wherein the first attribute opening value verifies that the first input attribute value is the first attribute value with which the first attribute commitment value was generated,
program instructions to evaluate with the first attribute opening value whether the first input attribute value is the first attribute value with which the first attribute commitment value was generated; and
based on the first input attribute value being the first attribute value with which the first attribute commitment value was generated, program instructions to evaluate whether the request is related to the hardcoded first attribute value by evaluating whether the request is related to the received first input attribute value.

24. The computer system of claim 23, further comprising:
program instructions to receive the first attribute commitment value by receiving a presentation token comprising the first attribute commitment value and an attribute signature, wherein the attribute signature certifies the authenticity of the first attribute commitment value and certifies that an attribute derivation function with which the first attribute commitment value was generated;
program instructions to evaluate with an attribute signature verification key whether the attribute signature certifies the authenticity of the received first attribute commitment value; and
based on the authenticity of the first attribute commitment value being verified, program instructions to hardcode the received first attribute commitment value into the executable program logic.

* * * * *